United States Patent
Izumi

(10) Patent No.: US 8,353,748 B2
(45) Date of Patent: Jan. 15, 2013

(54) GAME DEVICE, METHOD OF CONTROLLING GAME DEVICE, AND INFORMATION RECORDING MEDIUM

(75) Inventor: Tadakatsu Izumi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 708 days.

(21) Appl. No.: 12/519,286

(22) PCT Filed: Nov. 26, 2007

(86) PCT No.: PCT/JP2007/072765
§ 371 (c)(1),
(2), (4) Date: Jun. 15, 2009

(87) PCT Pub. No.: WO2008/078488
PCT Pub. Date: Jul. 3, 2008

(65) Prior Publication Data
US 2009/0280898 A1    Nov. 12, 2009

(30) Foreign Application Priority Data

Dec. 22, 2006    (JP) ................................ 2006-346765

(51) Int. Cl.
*A63F 13/00*    (2006.01)
*A63F 9/24*    (2006.01)

(52) U.S. Cl. ..................... 463/4; 463/1; 463/31; 463/32

(58) Field of Classification Search .................. 463/31, 463/32, 33, 42, 1, 4
See application file for complete search history.

(56) References Cited

U.S. PATENT DOCUMENTS 5,393,037 A * 2/1995 Ehle et al. ....................... 266/44

(Continued)

FOREIGN PATENT DOCUMENTS

EP    830880 A2 *    3/1998

(Continued)

OTHER PUBLICATIONS p1r4t8r, "Time Crisis: Time for some serious light gun action" retrieved from Internet url:<http://www.gamefaqs.com/ps/199016-time-crisis/reviews/review-45232> on Jan. 16, 2012, published Dec. 15, 2002, p. 1-2.*

(Continued)

*Primary Examiner* — Dmitry Suhol
*Assistant Examiner* — Ryan Hsu
(74) *Attorney, Agent, or Firm* — Sughrue Mion, PLLC

(57) ABSTRACT

Provided is a game device capable of allowing a user to designate a position within a region of a game space which is not being displayed on a game screen. If it is judged that a screen coordinate value according to a user's operation is within the game screen showing a state of a first region within the game space, a position-in-first-region acquisition unit (83a) acquires a position within the first region corresponding to the screen coordinate value. If it is judged that the screen coordinate value is not within the game screen, a second display control unit (86b) causes an image showing a state of a second region within the game space to be displayed on a part of the game screen based on a positional relationship between the screen coordinate value and the game screen for at least a predetermined time. If it is judged that the screen coordinate value is within a region in which the image showing the state of the second region is displayed, a position-in-second-region acquisition unit (83b) acquires a position within the second region corresponding to the screen coordinate value in place of the position-in-first-region acquisition unit (83a).

9 Claims, 21 Drawing Sheets

U.S. PATENT DOCUMENTS

| | | | |
|---|---|---|---|
| 5,393,071 A * | 2/1995 | Best | 463/35 |
| 5,393,073 A * | 2/1995 | Best | 463/35 |
| 5,572,251 A | 11/1996 | Ogawa | |
| 6,231,143 B1 * | 5/2001 | Stijns | 312/331 |
| 6,431,982 B2 * | 8/2002 | Kobayashi | 463/4 |
| 7,927,216 B2 * | 4/2011 | Ikeda et al. | 463/38 |
| 2001/0001091 A1 * | 5/2001 | Asai et al. | 463/33 |
| 2001/0006908 A1 | 7/2001 | Fujioka et al. | |
| 2002/0036617 A1 * | 3/2002 | Pryor | 345/156 |
| 2005/0221893 A1 | 10/2005 | Ohta | |
| 2006/0040740 A1 | 2/2006 | DiDato | |
| 2006/0258455 A1 | 11/2006 | Kando | |
| 2007/0265088 A1 | 11/2007 | Nakada et al. | |
| 2008/0088646 A1 * | 4/2008 | Sako et al. | 345/647 |

FOREIGN PATENT DOCUMENTS

| | | | |
|---|---|---|---|
| JP | 61-113489 A | 5/1986 | |
| JP | 10-333834 A | 12/1998 | |
| JP | 2001-170355 A | 6/2001 | |
| JP | 3262677 B2 | 3/2002 | |
| JP | 2005-021458 A | 1/2005 | |
| JP | 1550490 A1 | 7/2005 | |
| JP | 2005-279165 A | 10/2005 | |
| JP | 2006-181286 A | 7/2006 | |
| JP | 2006-314536 A | 11/2006 | |
| TW | 588258 | 5/2004 | |
| TW | I263525 B | 10/2006 | |
| WO | 02/057894 A2 | 7/2002 | |

OTHER PUBLICATIONS

European Search Report corresponding to European Patent Application No. 07832490.2 dated Nov. 23, 2009.

Taiwanese Office Action corresponding to Taiwanese Patent Application No. 096147589, dated Apr. 18, 2011.

International Preliminary Report on Patentability and Written Opinion, dated Jul. 2, 2009, issued in corresponding International Application No. PCT/JP2007/072765, 8 pages.

* cited by examiner

FIG.15
| PLAYER OBJECT ID | POSITION | MOTION DATA DURING REPRODUCTION |
|---|---|---|
| P 1 0 1 | . . . | . . . |
| . . . | . . . | . . . |
| P 2 0 1 | . . . | . . . |
| . . . | . . . | . . . |
| MOTION DATA REPRODUCING POSITION | MOVING DIRECTION | MOVING SPEED |
|---|---|---|
| . . . | . . . | . . . |
| . . . | . . . | . . . |
| . . . | . . . | . . . |
| . . . | . . . | . . . |
| BALL KEEPING FLAG | OPERATION SUBJECT FLAG | MOVEMENT TARGET POSITION |
|---|---|---|
| . . . | . . . | . . . |
| . . . | . . . | . . . |
| . . . | . . . | . . . |
| . . . | . . . | . . . |

GAME DEVICE, METHOD OF CONTROLLING GAME DEVICE, AND INFORMATION RECORDING MEDIUM

TECHNICAL FIELD

The present invention relates to a game device, a game device control method, and an information recording medium.

BACKGROUND ART

There is proposed a game device in which a screen coordinate value (coordinate value in a screen coordinate system) is acquired according to a user's operation to advance a game based on the screen coordinate value. For example, there is proposed a game device in which a game is advanced based on a screen coordinate value input by using such a pointing device as disclosed in Patent Document 1.
Patent Document 1: JP 3262677 B

DISCLOSURE OF THE INVENTION

Problem to be Solved by the Invention

On such a game device, it is possible to realize, for example, such a soccer game as to allow a user to designate a movement target position or the like of a player character by using the above-mentioned pointing device to point to a position within a game screen showing a state of a display subject region of a game space. However, in order to realize such a game, it is necessary to allow the user to designate the position within a region of the game space which is not being displayed on the game screen (region outside the display subject region of the game space).

The present invention has been made in view of the above-mentioned problem, and therefore an object thereof is to provide a game device, a game device control method, and an information recording medium, which are capable of allowing a user to designate a position within a region of a game space which is not being displayed on a game screen.

Means for Solving the Problem

In order to solve the above-mentioned problem, a game device according to the present invention comprises: first display control means for causing a game screen showing a state of a first region within a game space to be displayed; screen coordinate value acquisition means for acquiring a screen coordinate value according to a user's operation; first judgment means for judging whether or not the screen coordinate value acquired by the screen coordinate value acquisition means is a screen coordinate value within the game screen; position-in-first-region acquisition means for acquiring, if it is judged that the screen coordinate value acquired by the screen coordinate value acquisition means is a screen coordinate value within the game screen, a position within the first region corresponding to the screen coordinate value acquired by the screen coordinate value acquisition means; second display control means for causing, if it is judged that the screen coordinate value acquired by the screen coordinate value acquisition means is not a screen coordinate value within the game screen, an image showing a state of a second region within the game space to be displayed on a part of the game screen based on a positional relationship between the screen coordinate value acquired by the screen coordinate value acquisition means and the game screen for at least a predetermined time; second judgment means for judging, if the image showing the state of the second region is displayed, whether or not the screen coordinate value acquired by the screen coordinate value acquisition means is a screen coordinate value within a region in which the image showing the state of the second region is displayed; position-in-second-region acquisition means for acquiring, if it is judged that the screen coordinate value acquired by the screen coordinate value acquisition means is a screen coordinate value within the region in which the image showing the state of the second region is displayed, a position within the second region corresponding to the screen coordinate value acquired by the screen coordinate value acquisition means in place of the position-in-first-region acquisition means; and game advancing means for advancing a game based on the position acquired by the position-in-first-region acquisition means or the position-in-second-region acquisition means.

A game device control method according to the present invention comprises: a first display control step of causing a game screen showing a state of a first region within a game space to be displayed; a screen coordinate value acquisition step of acquiring a screen coordinate value according to a user's operation; a first judgment step of judging whether or not the screen coordinate value acquired in the screen coordinate value acquisition step is a screen coordinate value within the game screen; a position-in-first-region acquisition step of, if it is judged that the screen coordinate value acquired in the screen coordinate value acquisition step is a screen coordinate value within the game screen, acquiring a position within the first region corresponding to the screen coordinate value acquired in the screen coordinate value acquisition step; a second display control step of, if it is judged that the screen coordinate value acquired in the screen coordinate value acquisition step is not a screen coordinate value within the game screen, causing an image showing a state of a second region within the game space to be displayed on a part of the game screen based on a positional relationship between the screen coordinate value acquired in the screen coordinate value acquisition step and the game screen for at least a predetermined time; a second judgment step of, if the image showing the state of the second region is displayed, judging whether or not the screen coordinate value acquired in the screen coordinate value acquisition step is a screen coordinate value within a region in which the image showing the state of the second region is displayed; a position-in-second-region acquisition step of, if it is judged that the screen coordinate value acquired in the screen coordinate value acquisition step is a screen coordinate value within the region in which the image showing the state of the second region is displayed, acquiring a position within the second region corresponding to the screen coordinate value acquired in the screen coordinate value acquisition step in place of the position-in-first-region acquisition step; and a game advancing step of advancing a game based on the position acquired in the position-in-first-region acquisition step or the position-in-second-region acquisition step.

A program according to the present invention is a program which causes a computer such as a home-use game machine, a portable game machine, a business-use game machine, a portable phone, a personal digital assistant (PDA), and a personal computer to function as: first display control means for causing a game screen showing a state of a first region within a game space to be displayed; screen coordinate value acquisition means for acquiring a screen coordinate value according to a user's operation; first judgment means for judging whether or not the screen coordinate value acquired by the screen coordinate value acquisition means is a screen coordinate value within the game screen; position-in-first-region acquisition means for, if it is judged that the screen coordinate value acquired by the screen coordinate value acquisition means is a screen coordinate value within the game screen, acquiring a position within the first region corresponding to the screen coordinate value acquired by the screen coordinate value acquisition means; second display control means for, if it is judged that the screen coordinate value acquired by the screen coordinate value acquisition means is not a screen coordinate value within the game screen, causing an image showing a state of a second region within the game space to be displayed on a part of the game screen based on a positional relationship between the screen coordinate value acquired by the screen coordinate value acquisition means and the game screen for at least a predetermined time; second judgment means for, if the image showing the state of the second region is displayed, judging whether or not the screen coordinate value acquired by the screen coordinate value acquisition means is a screen coordinate value within a region in which the image showing the state of the second region is displayed; position-in-second-region acquisition means for, if it is judged that the screen coordinate value acquired by the screen coordinate value acquisition means is a screen coordinate value within the region in which the image showing the state of the second region is displayed, acquiring a position within the second region corresponding to the screen coordinate value acquired by the screen coordinate value acquisition means in place of the position-in-first-region acquisition means; and game advancing means for advancing a game based on the position acquired by the position-in-first-region acquisition means or the position-in-second-region acquisition means.

Further, an information recording medium according to the present invention is a computer-readable information recording medium recorded with the above-mentioned program. Further, a program delivery device according to the present invention is a program delivery device including an information recording medium recorded with the above-mentioned program, for reading the above-mentioned program from the information recording medium and delivering the program. Further, a program delivery method according to the present invention is a program delivery method of reading the above-mentioned program from an information recording medium recorded with the above-mentioned program and delivering the program.

In the present invention, the game screen showing the state of the first region within the game space is displayed. Note that the "game space" includes a three-dimensional game space constituted of three coordinate elements and a two-dimensional game space constituted of two coordinate elements. Further, in the present invention, a screen coordinate value according to a user's operation is acquired. It is judged whether or not the screen coordinate value according to the user's operation is a screen coordinate value within the game screen. If it is judged that the screen coordinate value according to the user's operation is a screen coordinate value within the game screen, the position within the above-mentioned first region corresponding to the screen coordinate value is acquired. Further, in the present invention, if it is judged that the screen coordinate value according to the user's operation is not a screen coordinate value within the game screen, the image showing the state of the second region within the game space is displayed on a part of the game screen for at least the predetermined time based on the positional relationship between the screen coordinate value and the game screen. Then, when the image showing the state of the second region is displayed, it is judged whether or not the screen coordinate value according to the user's operation is a screen coordinate value within the region in which the image showing the state of the second region is being displayed. If it is judged that the screen coordinate value according to the user's operation is a screen coordinate value within the region in which the image showing the state of the second region is being displayed, the position within the above-mentioned second region which corresponds to the screen coordinate value is acquired in place of the position within the above-mentioned first region which corresponds to the screen coordinate value. Then, the game is advanced based on the acquired position. According to the present invention, it is possible to allow the user to designate the position within a region of the game space which is not being displayed on the game screen.

According to one aspect of the present invention, in the first region, a game character acting according to the user's operation may be located. Further, the second display control means may comprise: means for storing a display position condition related to a display position on the game screen and display size information related to a display size of the image showing the state of the second region on the game screen, in association with each other; and means for causing the image showing the state of the second region to be displayed on a part of the game screen based on the display size information associated with the display position condition satisfied by the display position of the game character on the game screen.

According to another aspect of the present invention, the screen coordinate value acquisition means may acquire a screen coordinate value according to the user's operation for each of a plurality of users. The first judgment means may judge, for each of the plurality of users, whether or not the screen coordinate value according to the user's operation is the screen coordinate value within the game screen. The second display control means may cause, if it is judged for at least some users of the plurality of users that the screen coordinate value according to the user's operation is not a screen coordinate value within the game screen, the image showing the state of the second region to be displayed on the part of the game screen for at least a predetermined time. The second judgment means may judge, for each of the at least some users, whether or not the screen coordinate value according to the user's operation is a screen coordinate value within the region in which the image showing the state of the second region is displayed. The position-in-second-region acquisition means may acquire, if it is judged for any one of the at least some users that the screen coordinate value according to the user's operation is a screen coordinate value within the region in which the image showing the state of the second region is displayed, a position within the second region corresponding to the screen coordinate value according to the user's operation in place of the position-in-first-region acquisition means.

According to still another aspect of the present invention, the first display control means may cause an image showing the state of the first region to be displayed. The second display control means may comprise: means for storing a judgment result condition related to a judgment result that has been obtained by the first judgment means for each of the plurality of users from a predetermined time before up to the present time, and composition manner information related to a manner in which the image showing the state of the second region is combined with the image showing the state of the first region, in association with each other; and means for causing an image formed by combining the image showing the state of the second region with a part of the image showing the state of the first region to be displayed on the game screen based on the composition manner information associated with the judgment result condition satisfied by the judgment result obtained by the first judgment means for each of the plurality of users from the predetermined time before up to the present time.

BRIEF DESCRIPTION OF THE DRAWINGS

FIG. 15 is a diagram illustrating an example of a player object information table.

BEST MODE FOR CARRYING OUT THE INVENTION

Hereinafter, an example of an embodiment of the present invention will be described in detail with reference to the drawings.

Figure 1:
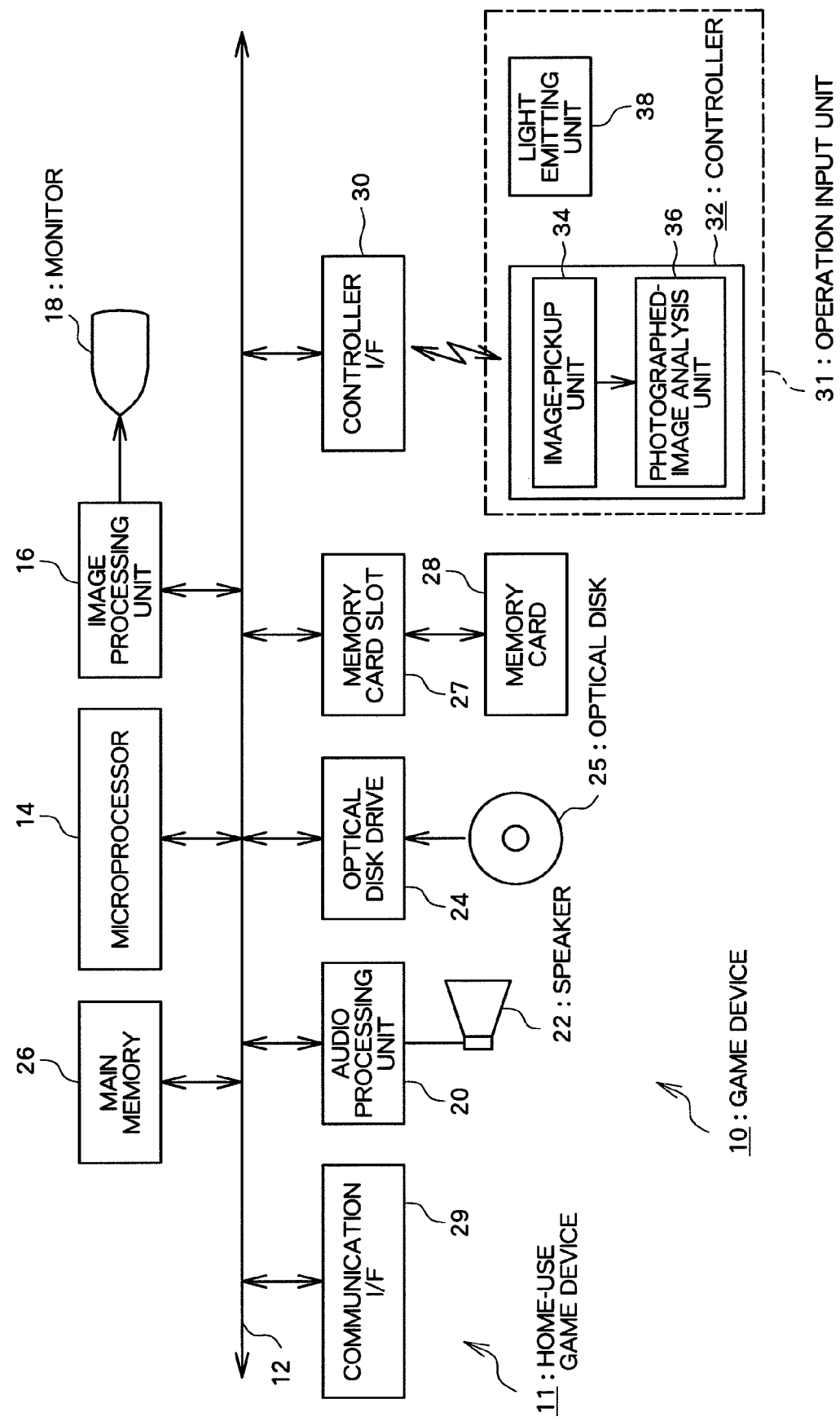
FIG. 1 is a diagram illustrating a hardware configuration of a game device according to an embodiment of the present invention.

FIG. 1 is a diagram illustrating a configuration of a game device according to the embodiment of the present invention. The game device 10 illustrated in FIG. 1 is configured by inserting an optical disk 25 and a memory card 28, which serve as information storage media, into a home-use game machine 11, and also connecting a monitor 18 and a speaker 22 to the home-use game machine 11. For example, a home-use TV set is used for the monitor 18, and a built-in speaker thereof is used for the speaker 22.

The home-use game machine 11 is a well-known computer game system including a bus 12, a microprocessor 14, an image processing unit 16, an audio processing unit 20, an optical disk drive 24, a memory card slot 27, a communication interface (I/F) 29, a controller interface (I/F) 30, and an operation input unit 31. The configurational components other than the operation input unit 31 are accommodated in an enclosure.

The bus 12 is for exchanging addresses and data among the units of the home-use game machine 11. The microprocessor 14, the image processing unit 16, the audio processing unit 20, the optical disk drive 24, the main memory 26, the memory card slot 27, the communication interface (I/F) 29, and the controller interface (I/F) 30 are connected via the bus 12 so as to communicate data with one another.

The microprocessor 14 controls the individual units of the home-use game machine 11 in accordance with an operating system stored in a ROM (not shown), a program or data read from the optical disk 25 or the memory card 28. The main memory 26 includes, for example, a RAM, and the program or data read from the optical disk 25 or the memory card 28 are written on the main memory 26 if necessary. The main memory 26 is also used for a working memory of the microprocessor 14.

The image processing unit 16 includes a VRAM and, based on image data sent from the microprocessor 14, renders a game screen on the VRAM. Then, the image processing unit 16 converts content thereof into video signals and outputs the video signals to the monitor 18 at predetermined timings. The audio processing unit 20, which includes a sound buffer, reproduces various categories of sound data such as game music, game sound effects, and messages that are read from the optical disk 25 and stored in the sound buffer, and outputs the sound data from the speaker 22.

The optical disk drive 24 reads the program or data recorded on the optical disk 25, such as a CD-ROM or a DVD-ROM, in accordance with an instruction given from the microprocessor 14. In this case, the optical disk 25 is employed for supplying the program or data to the home-use game machine 11, but any other information storage media such as ROM cards may also be used. Further, the program or data may also be supplied to the home-use game machine 11 from a remote location via a communication network such as the Internet.

The memory card slot 27 is an interface for insertion of the memory card 28. The memory card 28 includes a nonvolatile memory (for example, EEPROM). The memory card 28 is used for storing various kinds of game data such as saved data. The communication interface 29 is an interface for communicative connection to a data communication network such as the Internet.

The controller interface 30 is an interface for allowing a plurality of controllers 32 to perform wireless connection. As the controller interface 30, it is possible to use, for example, an interface conforming to the Bluetooth standards. Note that the controller interface 30 may be an interface for allowing the controllers 32 to perform wired connection.

Figure 2:
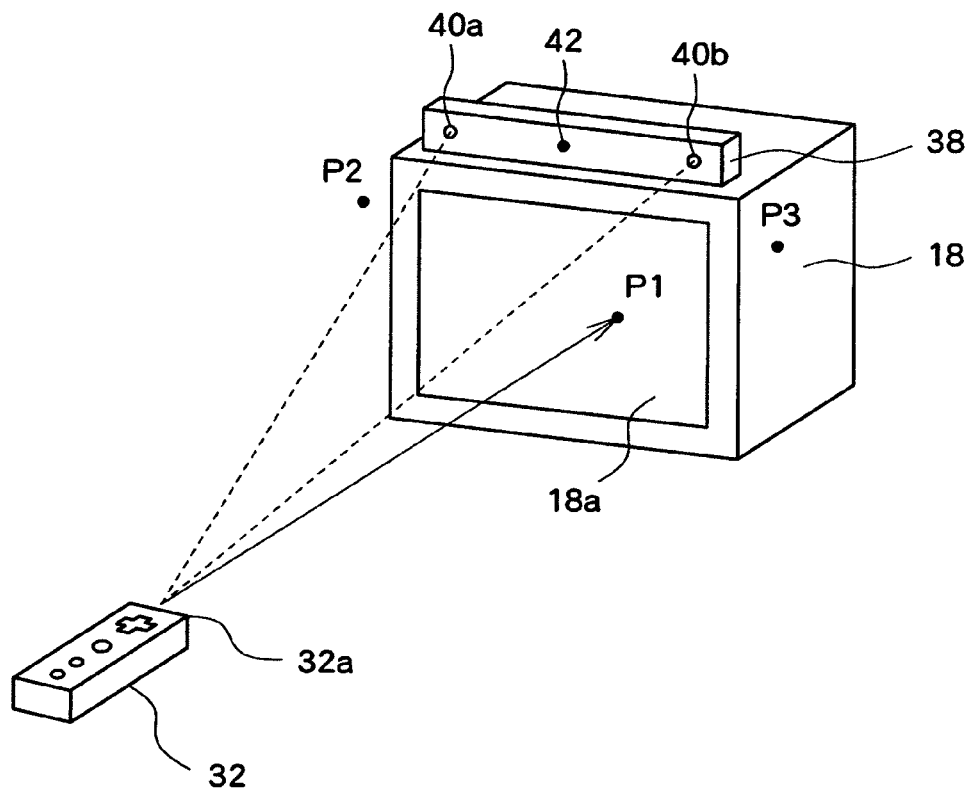
FIG. 2 is a diagram illustrating an example of an operation input unit.
Figure 3:
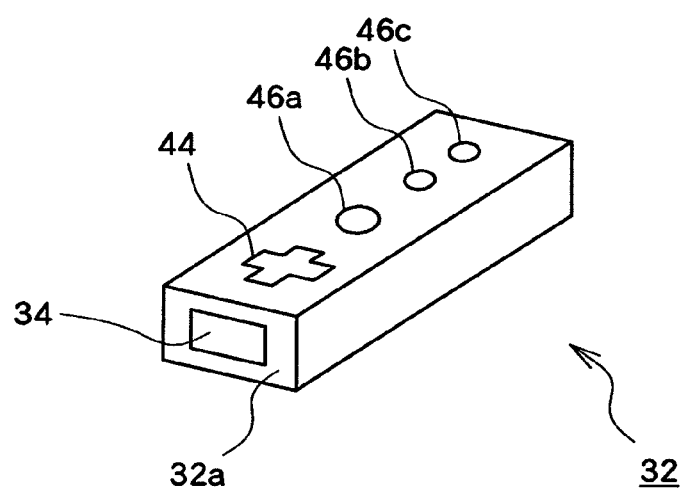
FIG. 3 is a diagram illustrating an example of a controller.

The operation input unit 31 is used for allowing a user to perform an operation input. The operation input unit 31 has a function as, for example, a pointing device and for allowing the user to point to a position on the game screen displayed on the monitor 18. As the operation input unit 31, it is possible to use, for example, technology disclosed in JP 3262677B. The operation input unit 31 includes one or a plurality of controllers 32 and one light-emitting unit 38. The controllers 32 include an image-pickup unit 34 and a photographed-image analysis unit 36. FIG. 2 is a diagram illustrating an example of the operation input unit 31. FIG. 3 is a diagram illustrating an example of the controller 32.

As illustrated in FIG. 2, the light emitting unit 38 is disposed on top of the monitor 18. The light emitting unit 38 is provided with a plurality of light sources. In the example of FIG. 2, the light emitting unit 38 is provided with light sources 40a and 40b on both end portions thereof. As illustrated in FIG. 3, the controller 32 is provided with a direction button 44 and buttons 46a, 46b, and 46c on a surface thereof. The direction button 44 has a cross shape, and is generally used to instruct which direction a character or a cursor be moved toward. The buttons 46a, 46b, and 46c are used for various kinds of game operations. The controller 32 is provided with, for example, the image-pickup unit 34 serving as an image-pickup element, such as a CCD, on a side surface thereof. In addition, the controller 32 has, for example, the photographed-image analysis unit 36, such as a microprocessor, built therein. Note that a side surface portion to which the image-pickup unit 34 is provided is referred to as a "front end portion 32a of the controller 32".

When the user aims the front end portion 32a of the controller 32 at the monitor 18, the light sources 40a and 40b are reflected on a photographed image of the image-pickup unit 34. The photographed-image analysis unit 36 analyzes the positions of the light sources 40a and 40b reflected on the photographed image of the image-pickup unit 34. The photographed-image analysis unit 36 acquires a position and an inclination of the controller 32 based on the analysis results. To be more specific, the photographed-image analysis unit 36 calculates a relative position of the controller 32 with respect to a predetermined reference position 42 and an inclination angle of the controller 32 with respect to a straight line that connects the light sources 40a and 40b. The game device 10 stores information related to a positional relationship between the reference position 42 and the game screen 18a displayed on the monitor 18, and based on this information, and the position and the inclination of the controller 32 acquired by the photographed-image analysis unit 36, a screen coordinate value of a position pointed by the front end portion 32a of the controller 32 is acquired.

Figure 4:
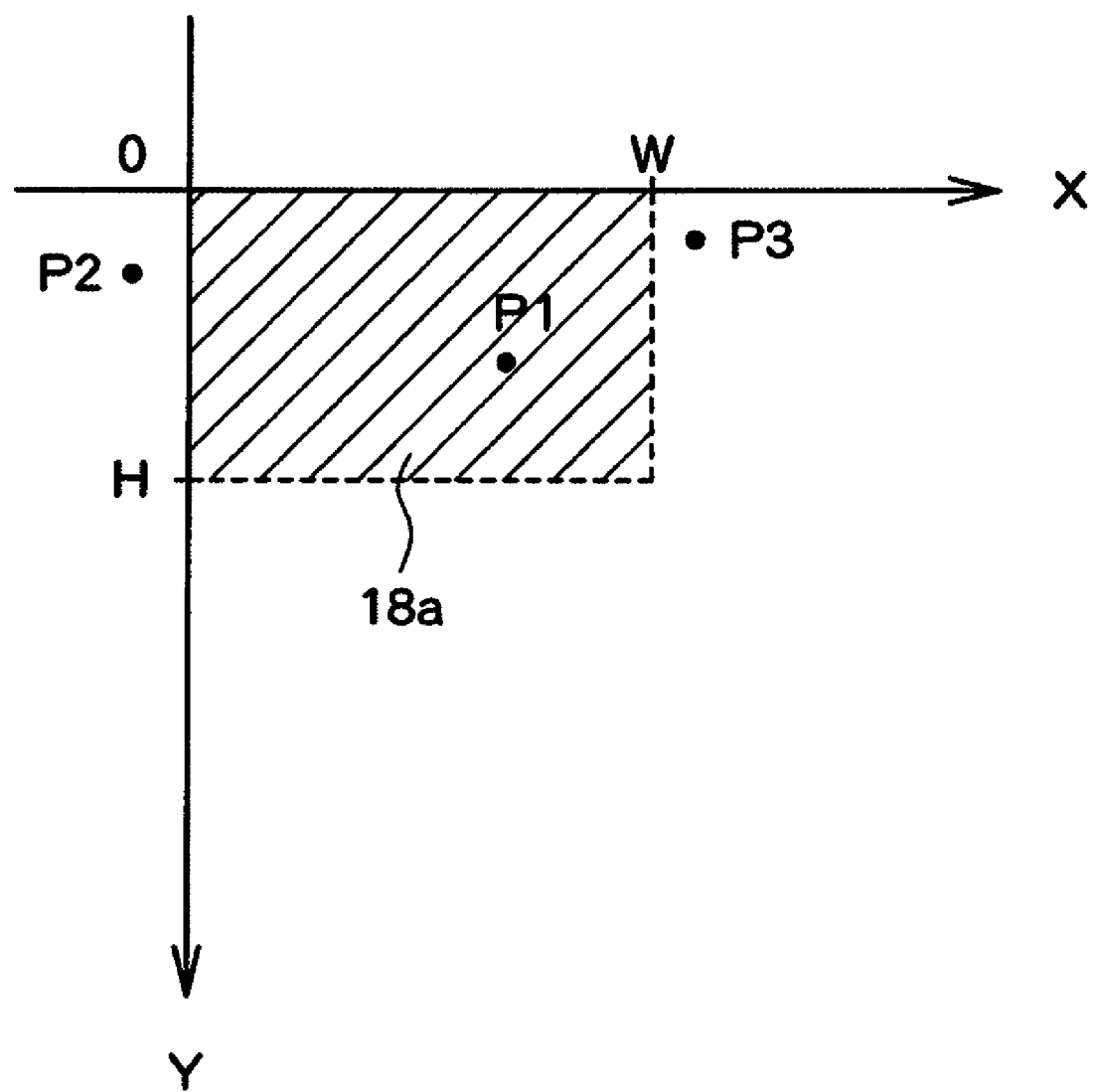
FIG. 4 is a diagram illustrating a screen coordinate system.

Here, the screen coordinate value represents a coordinate value in a screen coordinate system. As illustrated in FIG. 4, the screen coordinate system represents a coordinate system in which the origin point is set to the top left corner of the game screen 18a, the X-axis positive direction is set to the rightward direction of the game screen 18a, and the Y-axis positive direction is set to the downward direction of the game screen 18a. As illustrated in FIG. 4, a predetermined region in the screen coordinate system, that is, a region (diagonally shaded region) that satisfies the condition "$0 \leq X \leq W$ and $0 \leq Y \leq H$" is the region displayed on the monitor 18. Note that "W" denotes a width of the game screen 18a, and "H" denotes a height of the game screen 18a.

Note that the position pointed to by the front end portion 32a of the controller 32 is referred to as a "designation position of the controller 32". In addition, the information indicating the position and the inclination of the controller 32 acquired by the photographed-image analysis unit 36, that is, information for identifying the screen coordinate value of the designation position of the controller 32, is referred to as "pointing information".

The screen coordinate value of the designation position of the controller 32 is acquired as described above, and hence the screen coordinate value of the designation position of the controller 32 as long as the light sources 40a and 40b are reflected on the photographed image of the image-pickup unit 34. For example, in a case where the front end portion 32a of the controller 32 is aimed at a point P1 within the game screen 18a illustrated in FIGS. 2 and 4, a screen coordinate value of the point P1 is acquired. Further, for example, even in a case where the front end portion 32a of the controller 32 is aimed at a point P2 and a point P3 outside the game screen 18a illustrated in FIGS. 2 and 4, screen coordinate values of the point P2 and the point P3 are acquired as long as the light sources 40a and 40b are reflected on the photographed image of the image-pickup unit 34.

An operation signal indicating an operation state of the controller 32 is transmitted every predetermined cycle (for example, every $\frac{1}{60}$ seconds) from the controller 32 to the controller interface 30. The operation signal includes, for example, identification information for identifying the controller 32, the above-mentioned pointing information, and information indicating a depression state of each button. The controller interface 30 passes the operation signal received from the controller 32 to the microprocessor 14 via the bus 12. The microprocessor 14 judges a game operation performed by each of the controllers 32 based on the operation signal. For example, the microprocessor 14 identifies the designation position of the controller 32 based on the operation signal (pointing information). Further, for example, based on the operation signal, the microprocessor 14 judges whether or not a depression operation is performed on the direction button 44 and the buttons 46a, 46b, and 46c of each of the controllers 32.

On the game device 10 having the above-mentioned configuration, a competitive soccer game is played between a first user and a second user. The competitive soccer game is realized by executing a program for a soccer game read from the optical disk 25.

Figure 5:
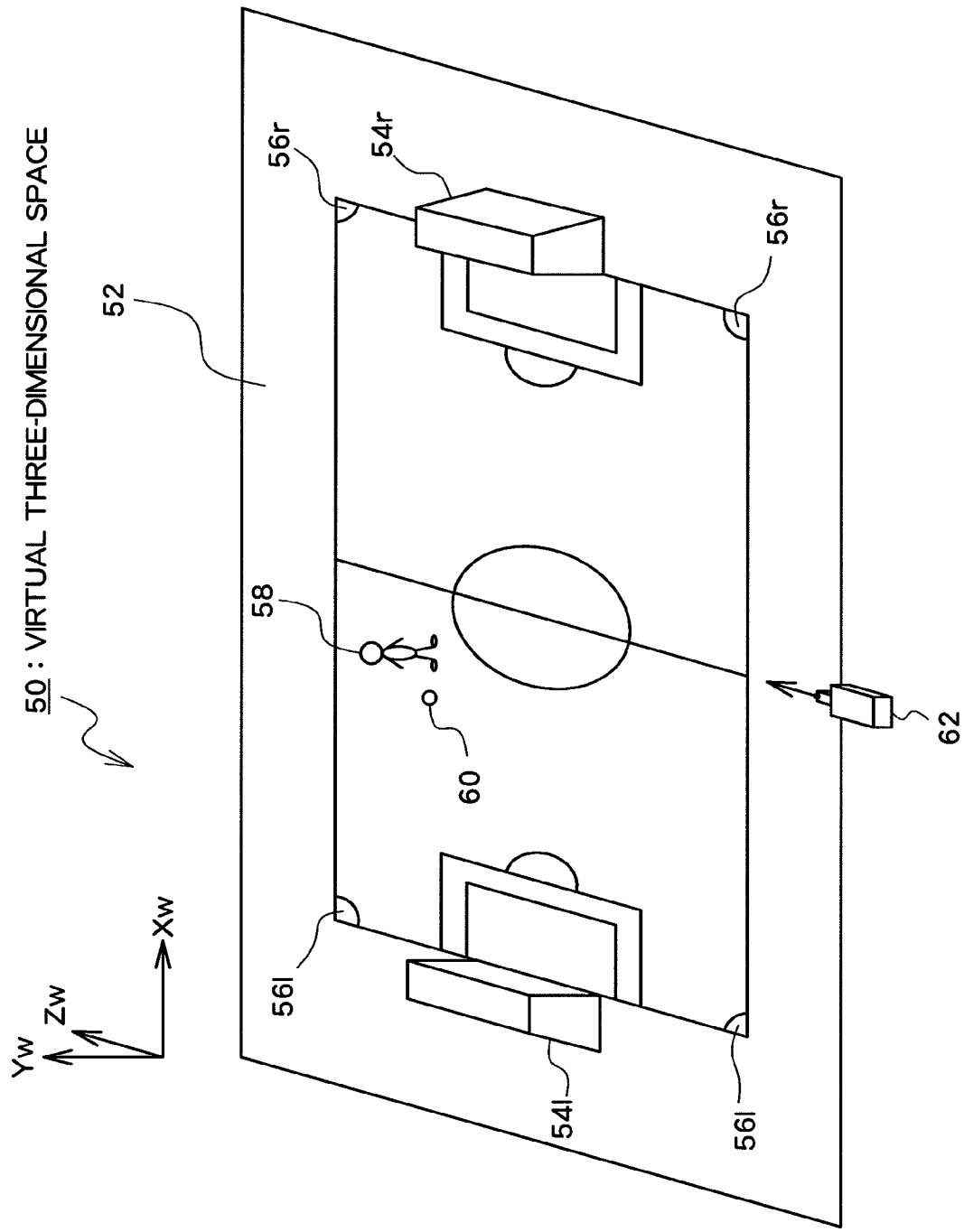
FIG. 5 is a diagram illustrating an example of a virtual three-dimensional space.

A virtual three-dimensional space (game space) is built in the main memory 26 of the game device 10. FIG. 5 illustrates an example of the virtual three-dimensional space. As illustrated in FIG. 5, a field object 52 representing a soccer field and goal objects 54l and 54r representing goals are located in a virtual three-dimensional space 50, which forms a soccer match venue. For example, corner areas 56l and 56r and the like are displayed on the field object 52. Located on the field object 52 are a player object 58 (game character) representing a soccer player and a ball object 60 representing a soccer ball. Though omitted from FIG. 5, eleven player objects 58 belonging to the first user's operation subject team (hereinafter, referred to as "first team") and eleven player objects 58 belonging to the second user's operation subject team (hereinafter, referred to as "second team") are located on the field object 52.

A virtual camera 62 (viewpoint and viewing direction) is set in the virtual three-dimensional space 50. The virtual camera 62 moves, for example, in the positive/negative directions along the axes Xw and Yw according to the movement of the ball object 60. A state of the virtual three-dimensional space 50 viewed from the virtual camera 62 is displayed on the monitor 18. In other words, a state of a region in the virtual three-dimensional space 50 included in the field of view of the virtual camera 62 is displayed on the monitor 18.

Figure 6:
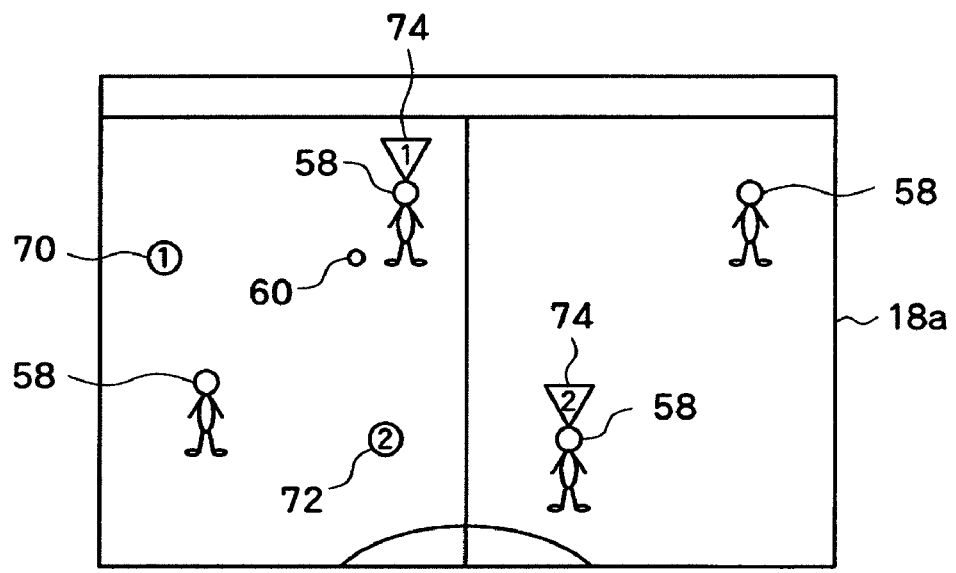
FIG. 6 is a diagram illustrating an example of a game screen.

FIG. 6 illustrates an example of the game screen 18*a*. As illustrated in FIG. 6, an image showing the state of the virtual three-dimensional space 50 viewed from the virtual camera 62 is displayed on the game screen 18*a*. Further displayed on the game screen 18*a* are a first cursor 70 indicating the designation position of the controller 32 of the first user and a second cursor 72 indicating the designation position of the controller 32 of the second user. The first cursor 70 and the second cursor 72 both have a circular shape. In addition, on the game screen 18*a*, an operation subject guiding mark 74 is displayed above the head of the player object 58 (player object 58 of an operation subject) acting according to the operation state of the controller 32.

In the soccer game, the user selects the operation subject from among the player objects 58 belonging to the operation subject team. For example, when the first user moves the first cursor 70 over one of the player objects 58 belonging to the first team and depresses an operation subject setting button (for example, button 46*c*), the one of the player objects 58 is set as the first user's operation subject.

Further, the user designates a moving direction of the player object 58 of the operation subject by pointing the moving direction with the front end portion 32*a* of the controller 32. For example, the player object 58 of the first user's operation subject moves toward a position on the field object 52 corresponding to the display position of the first cursor 70. Further, when the first user depresses the movement target position setting button (for example, button 46*b*), the position on the field object 52 corresponding to the display position of the first cursor 70 at that point in time is set as a movement target position of the player object 58 of the first user's operation subject. Once the movement target position is set, the player object 58 starts to move toward the movement target position irrespective of designation position of the controller 32. In this case, the player object 58 continues to move toward the movement target position even after the user switches the operation subject to another player object 58.

Further, the user designates a kicking direction of the player object 58 of the operation subject by pointing in the kicking direction with the front end portion 32*a* of the controller 32. For example, when the first user depresses a kick instructing button (for example, button 46*a*) while the player object 58 of the first user's operation subject is keeping the ball object 60, the player object 58 starts to kick the ball object 60 toward the position on the field object 52 corresponding to the display position of the first cursor 70. For example, when the first user depresses the kick instructing button while the first cursor 70 has been moved to the position of another player object 58, a pass is performed toward the another player object 58.

The soccer game is provided with an outside-screen position designation function. According to the outside-screen position designation function, the user can cause a state of the vicinity of the goal object 54*l* or 54*r* or the corner area 56*l* or 56*r* to be displayed on the game screen 18*a* even if the vicinity thereof is not being displayed on the game screen 18*a*, with the result that it is possible to designate a position in the vicinity thereof as the movement target position or a kick target position for the player object 58. Hereinafter, description is given of the outside-screen position designation function.

Figure 7:
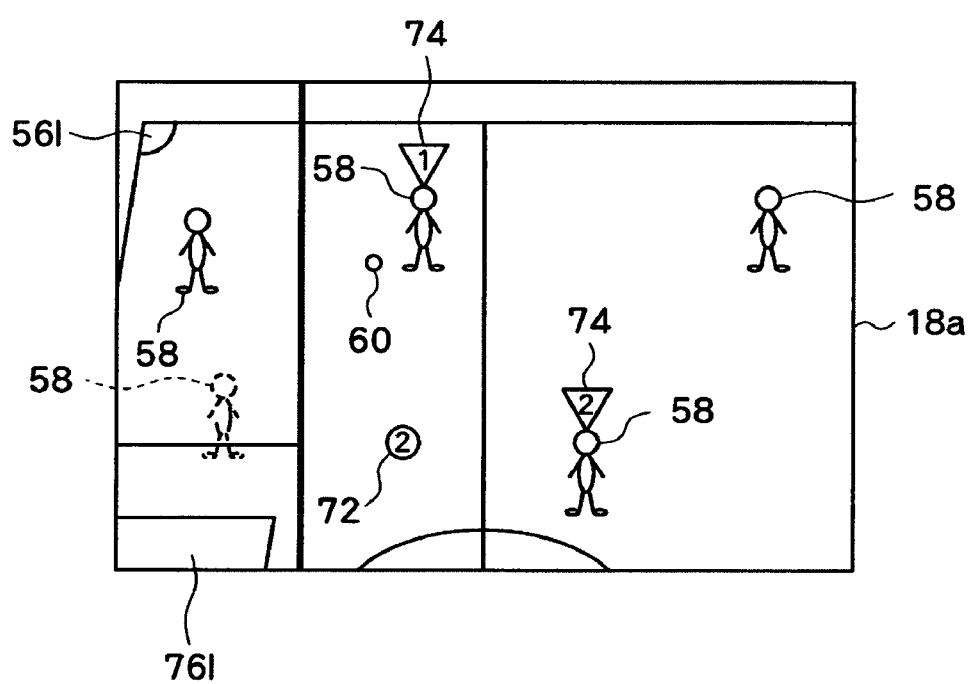
FIG. 7 is a diagram illustrating an example of the game screen.
Figure 8:
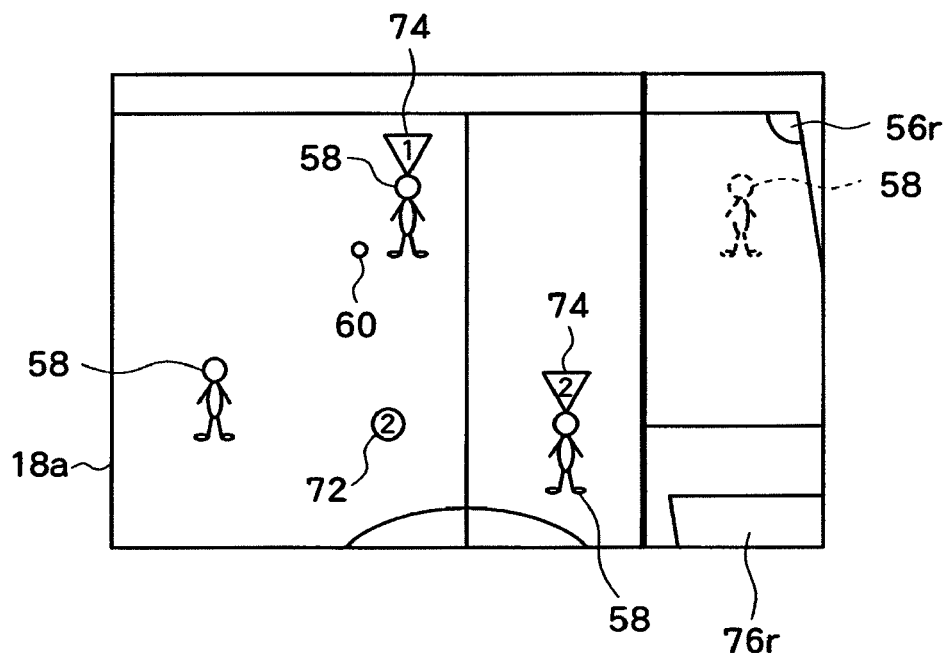
FIG. 8 is a diagram illustrating an example of the game screen.

While the vicinity of the goal object 54*l* or 54*r* or the corner area 56*l* or 56*r* is not being displayed on the game screen 18*a*, if the user wishes to designate a position in the vicinity thereof as the movement target position or the kick target position, the user first aims the front end portion 32*a* of the controller 32 toward a direction of a desired goal object or corner area outside the game screen 18*a*. Then, while maintaining that state, the user depresses an outside-screen region display instructing button (for example, button 46*b*). In this case, an image showing the state of the vicinity of the goal object or corner area existing on a side pointed to by the front end portion 32*a* of the controller 32 is displayed on the game screen 18*a*. FIG. 7 illustrates an example of the game screen 18*a* in a case where the first user aims the front end portion 32*a* of the controller 32 toward the left outside (for example, point P2; see FIG. 2) of the game screen 18*a* while the game screen 18*a* illustrated in FIG. 6 is being displayed. As illustrated in FIG. 7, in this case, an image (hereinafter, referred to as "left outside region image") 76*l* showing the state of the vicinity of the goal object 54*l* or the corner area 56*l*, which exists on the left outside of the game screen 18*a*, is displayed in a left end portion of the game screen 18*a*. FIG. 8 illustrates an example of the game screen 18*a* in a case where the first user aims the front end portion 32*a* of the controller 32 to the right outside (for example, point P3; see FIG. 2) of the game screen 18*a* while the game screen 18*a* illustrated in FIG. 6 is being displayed. As illustrated in FIG. 8, in this case, an image (hereinafter, referred to as "right outside region image") 76*r* showing the state of the vicinity of the goal object 54*r* or the corner area 56*r*, which exists on the right outside of the game screen 18*a*, is displayed in a right end portion of the game screen 18*a*. Note that a left outside region image 76*l* and a right outside region image 76*r* are displayed translucently on the game screen 18*a* illustrated in FIGS. 7 and 8. Therefore, an image that had originally been displayed in the left end portion or the right end portion of the game screen 18*a* can also be seen on the game screens 18*a* illustrated in FIGS. 7 and 8. FIGS. 7 and 8 use the dotted line to indicate the image that had originally been displayed in the left end portion or the right end portion of the game screen 18*a*. Further, it is preferable to display the left outside region image 76*l* so as to slide in from the left end of the game screen 18*a*. On the other hand, it is preferable to display the right outside region image 76*r* so as to slide in from the right end of the game screen 18*a*.

Figure 9:
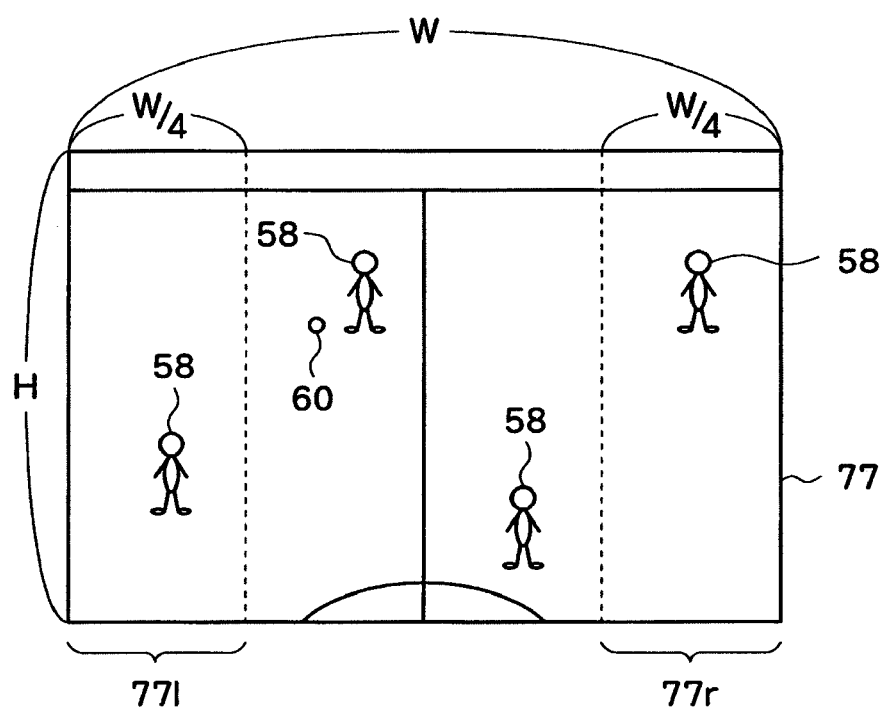
FIG. 9 is a diagram illustrating an example of a main field-of-view image.

The game screens 18*a* illustrated in FIGS. 7 and 8 are generated as described as follows. That is, an image (hereinafter, referred to as "main field-of-view image") showing a state of the virtual three-dimensional space 50 viewed from the virtual camera 62 is first generated. FIG. 9 illustrates an example of the main field-of-view image. Note that in this embodiment, the height and length of the main field-of-view image coincide with the height and length of the game screen 18*a*.

Figure 10:
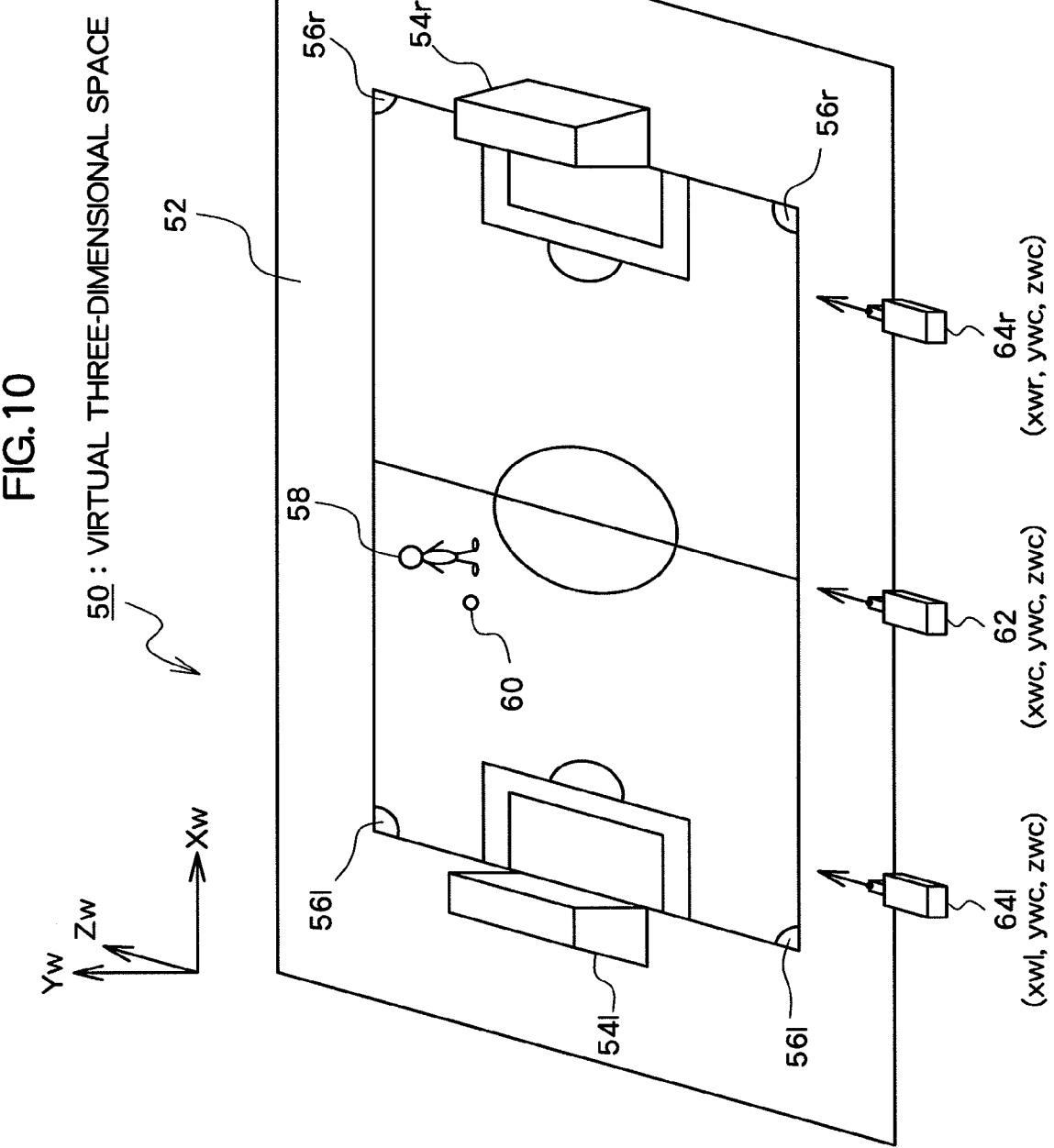
FIG. 10 is a diagram for describing a left sub-virtual camera and a right sub-virtual camera.

Next, a left sub-virtual camera 64*l* or a right sub-virtual camera 64*r*, for example, as illustrated in FIG. 10 is set. The left sub-virtual camera 64*l* is used for generating the image showing the state of the vicinity of the goal object 54*l* or the corner area 56*l*. The right sub-virtual camera 64*r* is used for generating the image showing the state of the vicinity of the goal object 54*r* or the corner area 56*r*. A position and a posture of the left sub-virtual camera 64*l* or the right sub-virtual camera 64*r* are set based on a position and a posture of the virtual camera 62 at that point in time. For example, assuming that the position of the virtual camera 62 at that point in time is (xwc, ywc, zwc), the position of the left sub-virtual camera 64*l* is set to (xwl, ywc, zwc). Meanwhile, for example, assuming that the position of the virtual camera 62 at that point in time is (xwc, ywc, zwc), the position of the right sub-virtual camera 64*r* is set to (xwr, ywc, zwc). Here, "xwl" and "xwr" are used as a predefined Xw-axis coordinate value. Further, for example, the posture of the left sub-virtual camera 64*l* or the right sub-virtual camera 64*r* is set to be the same posture as the posture of the virtual camera 62 at that point in time.

Figure 11:
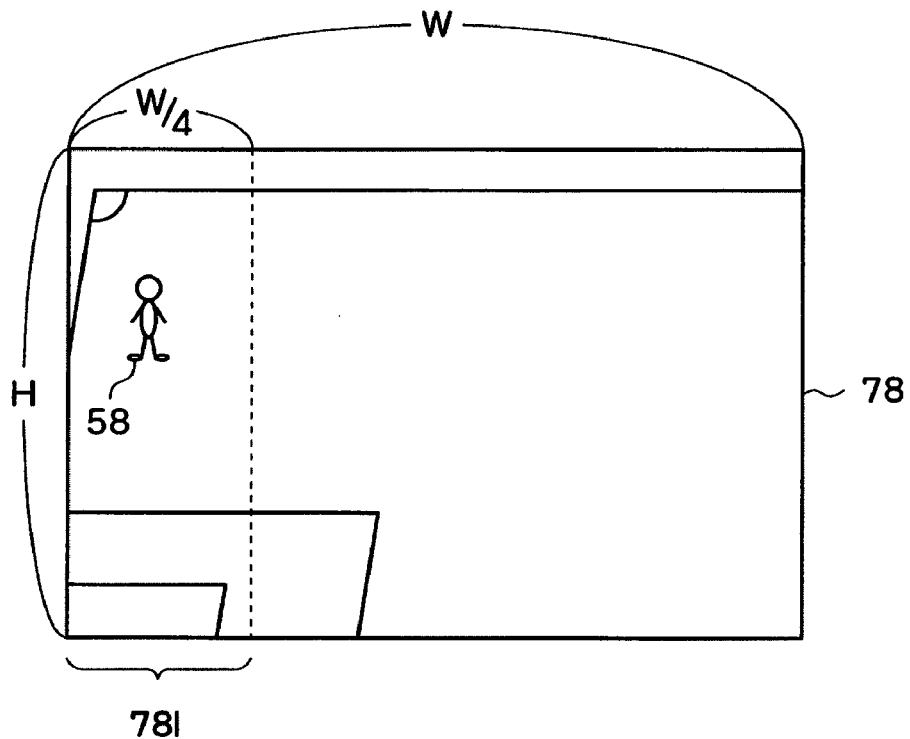
FIG. 11 is a diagram illustrating an example of a left sub-field-of-view image.

After that, the image showing the state of the virtual three-dimensional space 50 viewed from the left sub-virtual camera 64*l* or the right sub-virtual camera 64*r* is created. Hereinafter, the image showing the state of the virtual three-dimensional space 50 viewed from the left sub-virtual camera 64*l* is referred to as "left sub-field-of-view image", and the image showing the state of the virtual three-dimensional space 50 viewed from the right sub-virtual camera 64*r* is referred to as "right sub-field-of-view image". FIG. 11 illustrates an example of the left sub-field-of-view image. Note that in this embodiment, the height and length of the left sub-field-of-view image or the right sub-field-of-view image coincide with the height and length of the game screen 18*a*.

For example, in a case of displaying the left outside region image 76*l* onto the game screen 18*a*, a left end portion 78*l* of a left sub-field-of-view image 78 is cut out as the left outside region image 76*l*. Then, the left outside region image 76*l* is translucently combined with a left end portion 77*l* of a main field-of-view image 77 to thereby generate the game screen 18*a* illustrated in FIG. 7. Note that the left end portion 78*l* is a portion having a predetermined width from the left end of the left sub-field-of-view image 78, the width being ¼ of the entire width (W) of the left sub-field-of-view image 78. Further, the left end portion 77*l* is a portion having a predetermined width from the left end of the main field-of-view image 77, the width being ¼ of the entire width (W) of the main field-of-view image 77. In a similar manner, in a case of displaying the right outside region image 76*r* onto the game screen 18*a*, a right end portion of a right sub-field-of-view image is cut out as the right outside region image 76*r*. Then, the right outside region image 76*r* is translucently combined with a right end portion 77*r* of the main field-of-view image 77 to thereby generate the game screen 18*a* illustrated in FIG. 8. Note that FIGS. 7 and 8 use the dotted line to indicate a portion of the main field-of-view image 77 that can be translucently seen.

Figure 12:
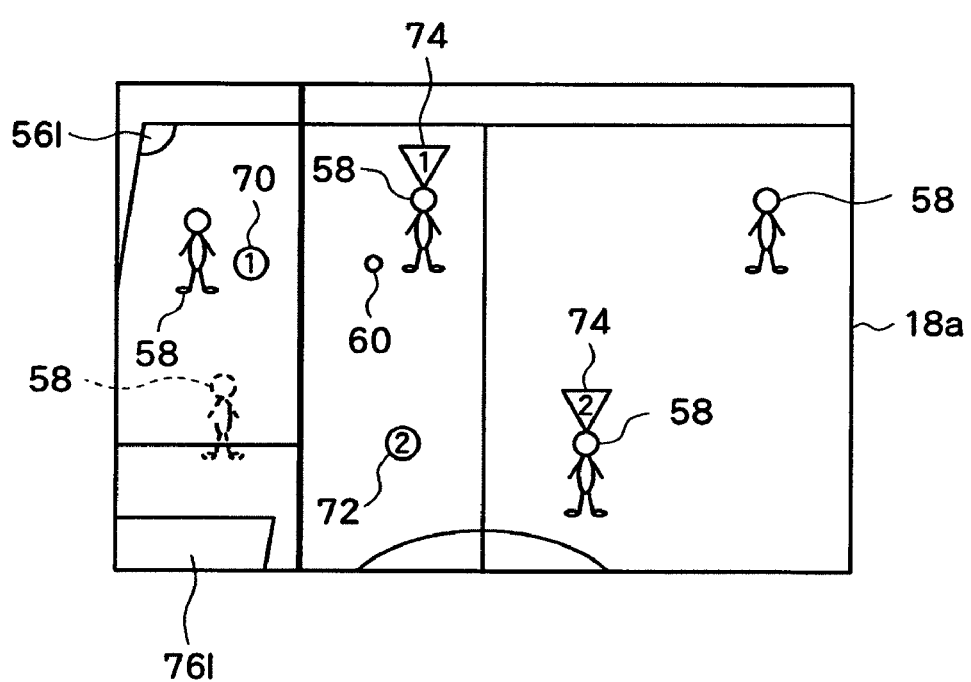
FIG. 12 is a diagram illustrating an example of the game screen.

The left outside region image 76*l* or the right outside region image 76*r* keeps being displayed over a predetermined period of time (in this embodiment, 1.5 seconds) even after the first user aims the front end portion 32*a* of the controller 32 toward the inside of the game screen 18*a* again. FIG. 12 illustrates an example of the game screen 18*a* in that case. By aiming the front end portion 32*a* of the controller 32 at the left outside region image 76*l* or the right outside region image 76*r* while the left outside region image 76*l* or the right outside region image 76*r* is being displayed, the first user can designate a position on the field object 52 displayed in the left outside region image 76*l* or the right outside region image 76*r* as the movement target position or the kick target position for the player object 58.

At this time, even if the second user aims the front end portion 32*a* of the controller 32 at the left outside region image 76*l* or the right outside region image 76*r*, the position on the field object 52 displayed in the left outside region image 76*l* or the right outside region image 76*r* cannot be designated as the movement target position or the kick target position for the player object 58. Instead, a position on the field object 52 displayed in the main field-of-view image 77, which is being translucently seen under the left outside region image 76*l* or the right outside region image 76*r*, is designated as the movement target position or the kick target position for the player object 58.

Figure 13:
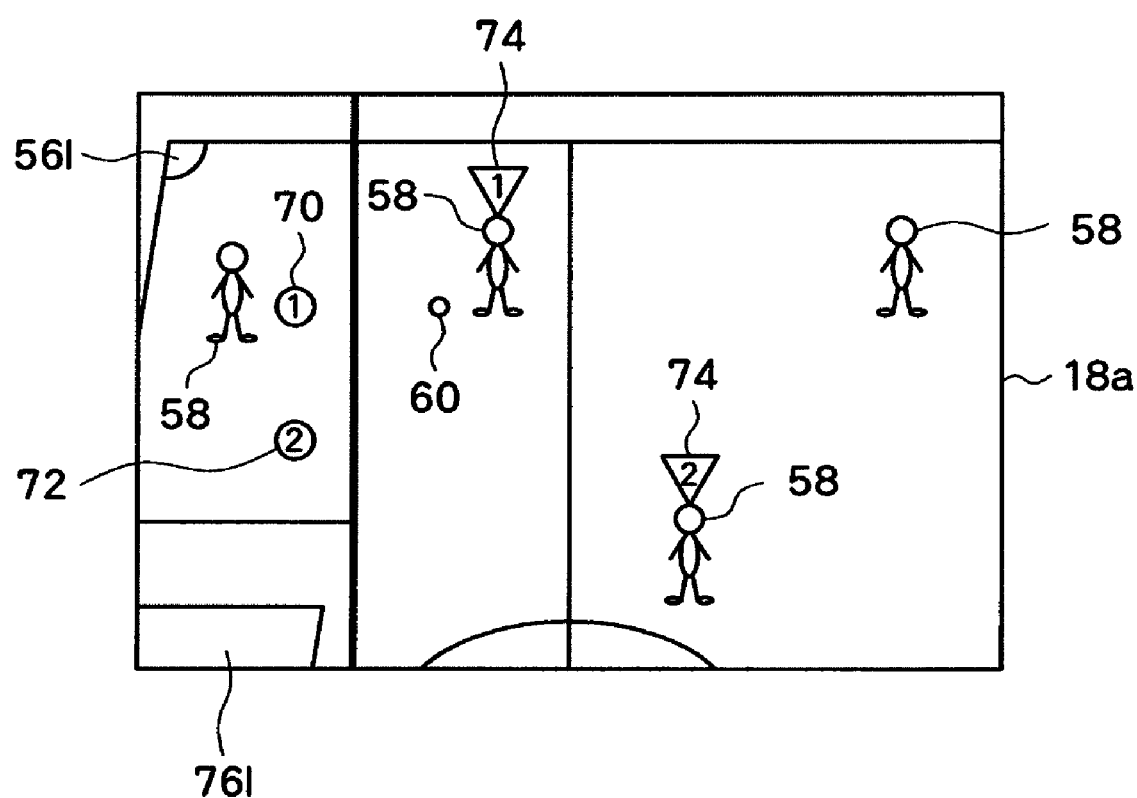
FIG. 13 is a diagram illustrating an example of the game screen.

However, if the second user aims the front end portion 32*a* of the controller 32 at the left outside region image 76*l* or the right outside region image 76*r* after the second user has depressed the outside-screen region display instructing button while aiming the front end portion 32*a* of the controller 32 toward the left outside or the right outside of the game screen 18*a*, a position on the field object 52 displayed in the left outside region image 76*l* or the right outside region image 76*r* is designated as the movement target position or the kick target position for the player object 58. FIG. 13 illustrates an example of the game screen 18*a* in that case. As illustrated in FIG. 13, on the game screen 18*a* in this case, the left outside region image 76*l* (or the right outside region image 76*r*) is opaquely combined with (drawn over) the main field-of-view image 77, and the left outside region image 76*l* (or the right outside region image 76*r*) is opaquely displayed.

According to the above-mentioned outside-screen position designation function, the user can cause the left outside region image 76*l* or the right outside region image 76*r* showing the state of the vicinity of the goal object 54*l* or 54*r* or the corner area 56*l* or 56*r* to be displayed on the game screen 18*a* if the vicinity thereof is not being displayed on the game screen 18*a*. Then, it becomes possible to designate a position in the vicinity thereof as the movement target position or the kick target position for the player object 58.

Note that in the above-mentioned outside-screen position designation function, the left outside region image 76*l* or the right outside region image 76*r* cannot be displayed simply by the user's operation of aiming the front end portion 32*a* of the controller 32 toward the left outside or the right outside of the game screen 18*a*. The left outside region image 76*l* or the right outside region image 76*r* is not displayed until the user depresses the outside-screen region image display instructing button. This prevents the left outside region image 76*l* or the right outside region image 76*r* from being erroneously displayed when the user happens to direct the front end portion 32*a* of the controller 32 to the outside of the game screen 18*a*.

Further, in the above-mentioned outside-screen position designation function, even if one of the users has caused the left outside region image 76*l* or the right outside region image 76*r* to be displayed on the game screen 18*a*, the other user can designate a position on the field object 52 displayed in the main field-of-view image 77, which is being translucently seen under the left outside region image 76*l* or the right outside region image 76*r*, as the movement target position or the kick target position for the player object 58. That is, in the above-mentioned outside-screen position designation function, if one of the users has caused the left outside region image 76*l* or the right outside region image 76*r* to be displayed on the game screen 18*a*, no limitation is imposed on an operation performed by the other user who wishes to designate a position on the field object 52 included in the field of view of the virtual camera 62 as the movement target position or the kick target position for the player object 58.

Further, in the above-mentioned outside-screen position designation function, in a case where one of the users has caused the left outside region image 76*l* or the right outside region image 76*r* to be displayed on the game screen 18*a*, when the other user intends to designate a position on the field object 52 displayed in the left outside region image 76*l* or the right outside region image 76*r* as the movement target position or the kick target position for the player object 58, the other user depresses the outside-screen region display instructing button with the front end portion 32*a* of the controller 32 being aimed at the left outside or the right outside of the game screen 18*a* to thereby become able to designate the position on the field object 52 displayed in the left outside region image 76*l* or the right outside region image 76*r* as the movement target position or the kick target position for the player object 58. Further, in such a case, the main field-of-view image 77 is not translucently seen under the left outside region image 76*l* or the right outside region image 76*r*, which makes it easy for both of the users to designate the position on the field object 52 displayed in the left outside region image 76*l* or the right outside region image 76*r* as the movement target position or the kick target position for the player object 58.

Hereinafter, description is given of a configuration related to the above-mentioned outside-screen position designation function.

Figure 14:
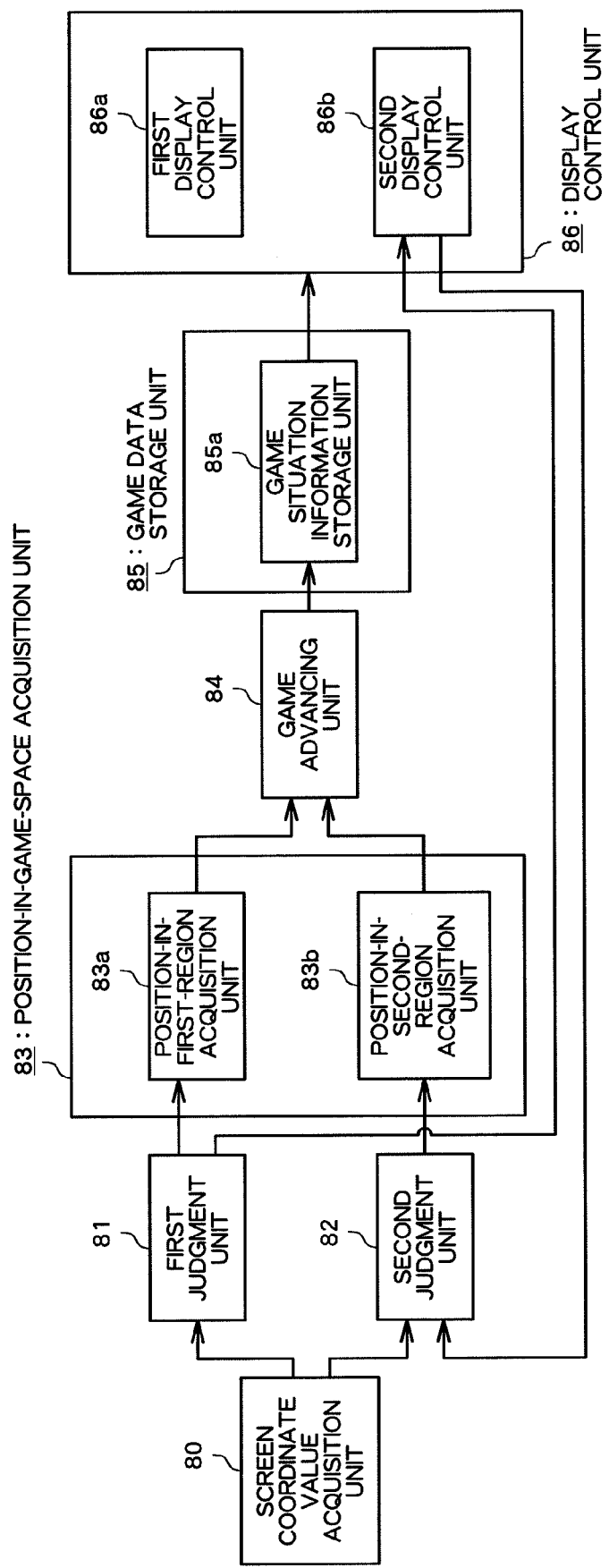
FIG. 14 is a functional block diagram of the game device according to the embodiment of the present invention.

First, description is given of functions implemented by the game device 10. FIG. 14 is a functional block diagram mainly illustrating functions related to the present invention among the functions implemented by the game device 10. As illustrated in FIG. 14, the game device 10 functionally includes a screen coordinate value acquisition unit 80, a first judgment unit 81, a second judgment unit 82, a position-in-game-space acquisition unit 83, a game advancing unit 84, a game data storage unit 85, and a display control unit 86. Those functional blocks are implemented by the microprocessor 14 executing a program read from the optical disk 25.

The game data storage unit 85 is implemented mainly by the optical disk 25 and the main memory 26. The game data storage unit 85 stores various kinds of data based on which a game is executed. For example, the game data storage unit 85 stores model data representing a shape of each object. In addition, for example, the game data storage unit 85 stores motion data of the player object 58. The motion data is data representing a change in posture made every predetermined time (in this embodiment, $1/60^{th}$ of a second) in a case where the player object 58 performs each of various kinds of actions (for example, traveling action, dribbling action, and kicking action). Note that causing the player object 58 to act according to the motion data is referred to as "reproducing the motion data". Further, the game data storage unit 85 stores parameters indicating levels of various capabilities of the player object 58 and a position thereof.

The game data storage unit 85 includes a game situation information storage unit 85*a*. The game situation information storage unit 85*a* stores game situation information indicating a current situation of the game. For example, the game situation information includes display position information on the first cursor 70 and the second cursor 72. The display position information on the first cursor 70 and the second cursor 72 represents information that indicates a display position of each of the first cursor 70 and the second cursor 72 within the game screen 18*a* by a screen coordinate value.

Further, for example, the game situation information includes information indicating a state of each player object 58. The main memory 26 stores a player object information table as illustrated in, for example, FIG. 15. The player object information table includes "player object ID", "position", "motion data during reproduction", "motion data reproducing position", "moving direction", "moving speed", "ball keeping flag", "operation subject flag", and "movement target position" fields. Identification information (ID) of the player object 58 is stored in the "player object ID" field. Information stored in the "position", "moving direction", and "moving speed" fields indicates a current position, a moving direction, and a moving speed, respectively, of the player object 58 within the virtual three-dimensional space 50 by using a world coordinate system (XwYwZw-coordinate system illustrated in FIG. 5). Identification information (ID) of the motion data that is being currently reproduced with regard to the player object 58 is stored in the "motion data during reproduction" field. Information that indicates a position at which the motion data is being currently reproduced is stored in the "motion data reproducing position" field. A posture of the player object 58 is identified by the "motion data during reproduction" and the "motion data reproducing position" fields. Information that indicates whether or not the player object 58 is keeping the ball object 60 is stored in the "ball keeping flag" field. Information that indicates whether or not the player object 58 is the operation subject is stored in the "operation subject flag" field. Information that indicates the movement target position set with respect to the player object 58 by using the world coordinate system is stored in the "movement target position" field.

Further, for example, the game situation information includes information indicating states of the ball object 60 and the virtual camera 62. The information indicating the state of the ball object 60 includes information that indicates, for example, a position, a moving direction, and a moving speed of the ball object 60 within the virtual three-dimensional space 50. The information indicating the state of the virtual camera 62 includes information that indicates, for example, a position, a posture, and an angle of view of the virtual camera 62 within the virtual three-dimensional space 50.

The display control unit 86 is implemented mainly by the microprocessor 14 and the image processing unit 16. The display control unit 86 includes a first display control unit 86*a* and a second display control unit 86*b*. The first display control unit 86*a* displays the state of the virtual three-dimensional space 50 viewed from the virtual camera 62 onto the game screen 18*a*. That is, the first display control unit 86*a* generates an image (main field-of-view image 77) showing a state of a region (first region) of the virtual three-dimensional space 50, which is included in the field of view of the virtual camera 62, based on the game situation information stored in the game situation information storage unit 85*a*, and displays the image onto the game screen 18*a*. The second display control unit 86*b* is described later.

The screen coordinate value acquisition unit 80 is implemented mainly by the microprocessor 14. For each of the first user and the second user, the screen coordinate value acquisition unit 80 acquires the screen coordinate value according to the user's operation. For each of the first user and the second user, the screen coordinate value acquisition unit 80 acquires the screen coordinate value of the designation position of the controller 32 of the user.

The first judgment unit 81 is implemented mainly by the microprocessor 14. For each of the first user and the second user, the first judgment unit 81 judges whether or not the designation position of the controller 32 of the user is within the game screen 18*a*. The first judgment unit 81 judges whether or not the screen coordinate value of the designation position of the controller 32 of each of the first user and the second user is a screen coordinate value within the game screen 18*a*.

The position-in-game-space acquisition unit 83 is implemented mainly by the microprocessor 14. The position-in-game-space acquisition unit 83 acquires a position within the virtual three-dimensional space 50 corresponding to the designation position of the controller 32. The position-in-game-space acquisition unit 83 includes a position-in-first-region acquisition unit 83*a* and a position-in-second-region acquisition unit 83*b*. If it is judged that the designation position of the controller 32 is within the game screen 18*a*, the position-in-first-region acquisition unit 83*a* acquires a position corresponding to the designation position of the controller 32 within the region (first region) of the virtual three-dimensional space 50 included in the field of view of the virtual camera 62. The position-in-second-region acquisition unit 83*b* will be described later.

If it is judged that the designation position of the controller 32 of at least one of the first user and the second user is not within the game screen 18a, based on a positional relationship between the screen coordinate value of the designation position and the game screen 18a, the second display control unit 86b displays the left outside region image 76l or the right outside region image 76r onto the game screen 18a for at least a predetermined time (in this embodiment, 1.5 seconds). As described above, the left outside region image 76l is an image showing a state of a region (second region) of the virtual three-dimensional space 50, which is included in the field of view of the left sub-virtual camera 64l, and in this embodiment, an image showing a state of a region in the vicinity of the goal object 54l or the corner area 56l. Further, the right outside region image 76r is an image showing a state of a region (second region) of the virtual three-dimensional space 50, which is included in the field of view of the right sub-virtual camera 64r, and in this embodiment, an image showing a state of a region in the vicinity of the goal object 54r or the corner area 56r.

The second display control unit 86b stores: a judgment result condition related to a judgment result that has been obtained by the first judgment unit 81 with regard to each of the first user and the second user from a predetermined time (in this embodiment, 1.5 seconds) before up to the present time; and composition manner information related to a manner in which the left outside region image 76l or the right outside region image 76r is combined with the main field-of-view image 77, in association with each other. Then, based on the composition manner information associated with the judgment result condition satisfied by the judgment result obtained by the first judgment unit 81 with regard to each of the first user and the second user from the predetermined time before up to the present time, the second display control unit 86b displays an image formed by combining the left outside region image 76l or the right outside region image 76r with a part of the main field-of-view image 77 onto the game screen 18a.

The second judgment unit 82 is implemented mainly by the microprocessor 14. If the left outside region image 76l or the right outside region image 76r is displayed on the game screen 18a because it has been judged that the designation position of the controller 32 of the first user is not within the game screen 18a, the second judgment unit 82 judges whether or not the designation position of the controller 32 of the first user is within the left outside region image 76l or the right outside region image 76r. Further, if the left outside region image 76l or the right outside region image 76r is displayed because it has been judged that the designation position of the controller 32 of the second user is not within the game screen 18a, the second judgment unit 82 judges whether or not the designation position of the controller 32 of the second user is within the left outside region image 76l or the right outside region image 76r.

If the second judgment unit 82 judges that the designation position of the controller 32 of the first user is within the left outside region image 76l or the right outside region image 76r, the position-in-second-region acquisition unit 83b acquires a position corresponding to the designation position of the controller 32 of the first user within the region on the field object 52 displayed in the left outside region image 76l or the right outside region image 76r. Further, if the second judgment unit 82 judges that the designation position of the controller 32 of the second user is within the left outside region image 76l or the right outside region image 76r, the position-in-second-region acquisition unit 83b acquires a position corresponding to the designation position of the controller 32 of the second user within the region on the field object 52 displayed in the left outside region image 76l or the right outside region image 76r.

The game advancing unit 84 is implemented mainly by the microprocessor 14. The game advancing unit 84 advances the soccer game based on the position acquired by the position-in-first-region acquisition unit 83a or the position-in-second-region acquisition unit 83b. The game advancing unit 84 updates the state information on the player object 58 of the first user's operation subject or the state information on the ball object 60, which are stored in the game situation information storage unit 85a, based on the position on the field object 52 corresponding to the designation position of the controller 32 of the first user, which has been acquired by the position-in-first-region acquisition unit 83a or the position-in-second-region acquisition unit 83b. Further, the game advancing unit 84 updates the state information on the player object 58 of the second user's operation subject or the state information on the ball object 60, which are stored in the game situation information storage unit 85a, based on the position on the field object 52 corresponding to the designation position of the controller 32 of the second user, which has been acquired by the position-in-first-region acquisition unit 83a or the position-in-second-region acquisition unit 83b.

Figure 16:
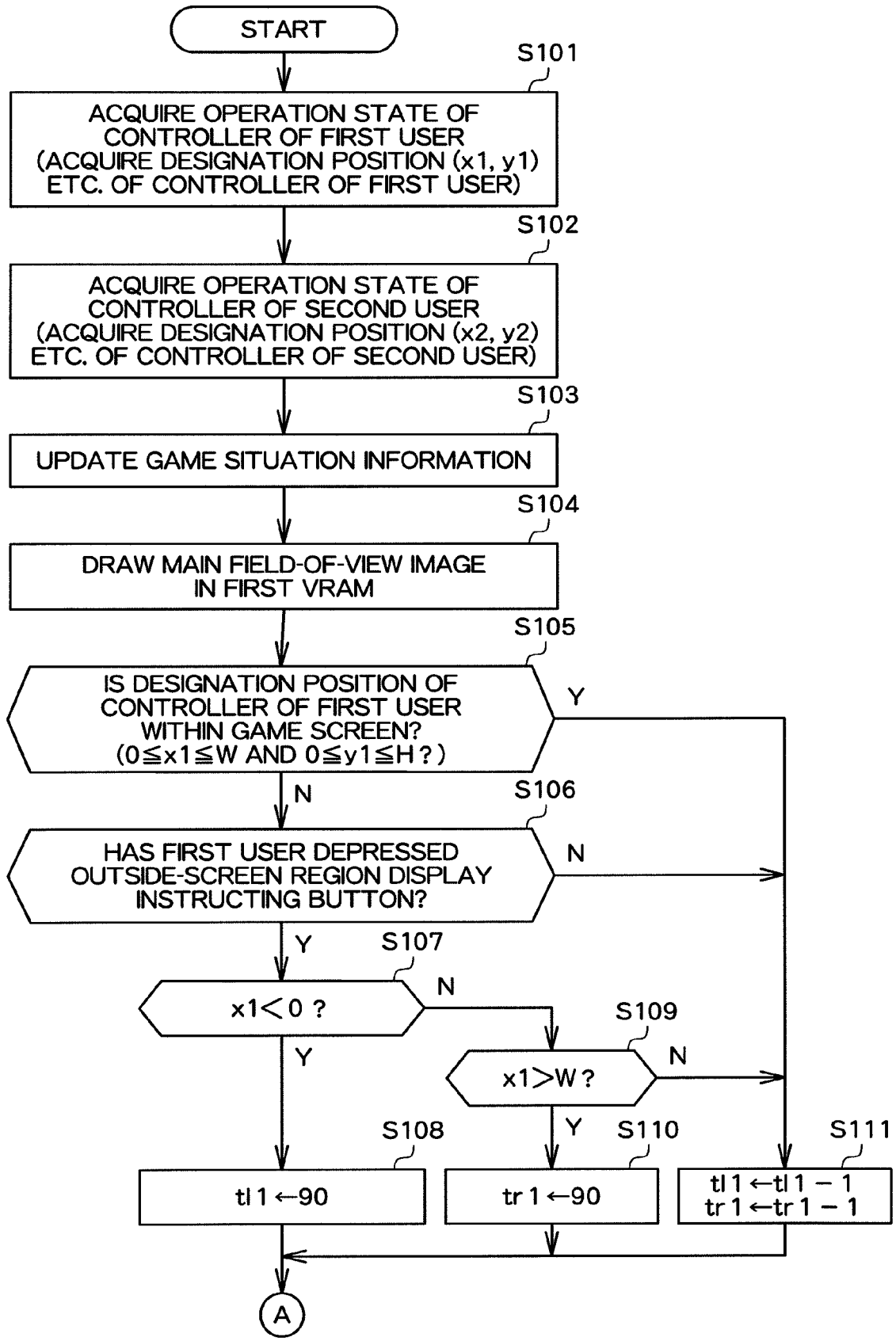
FIG. 16 is a flowchart illustrating processing executed on the game device.
Figure 17:
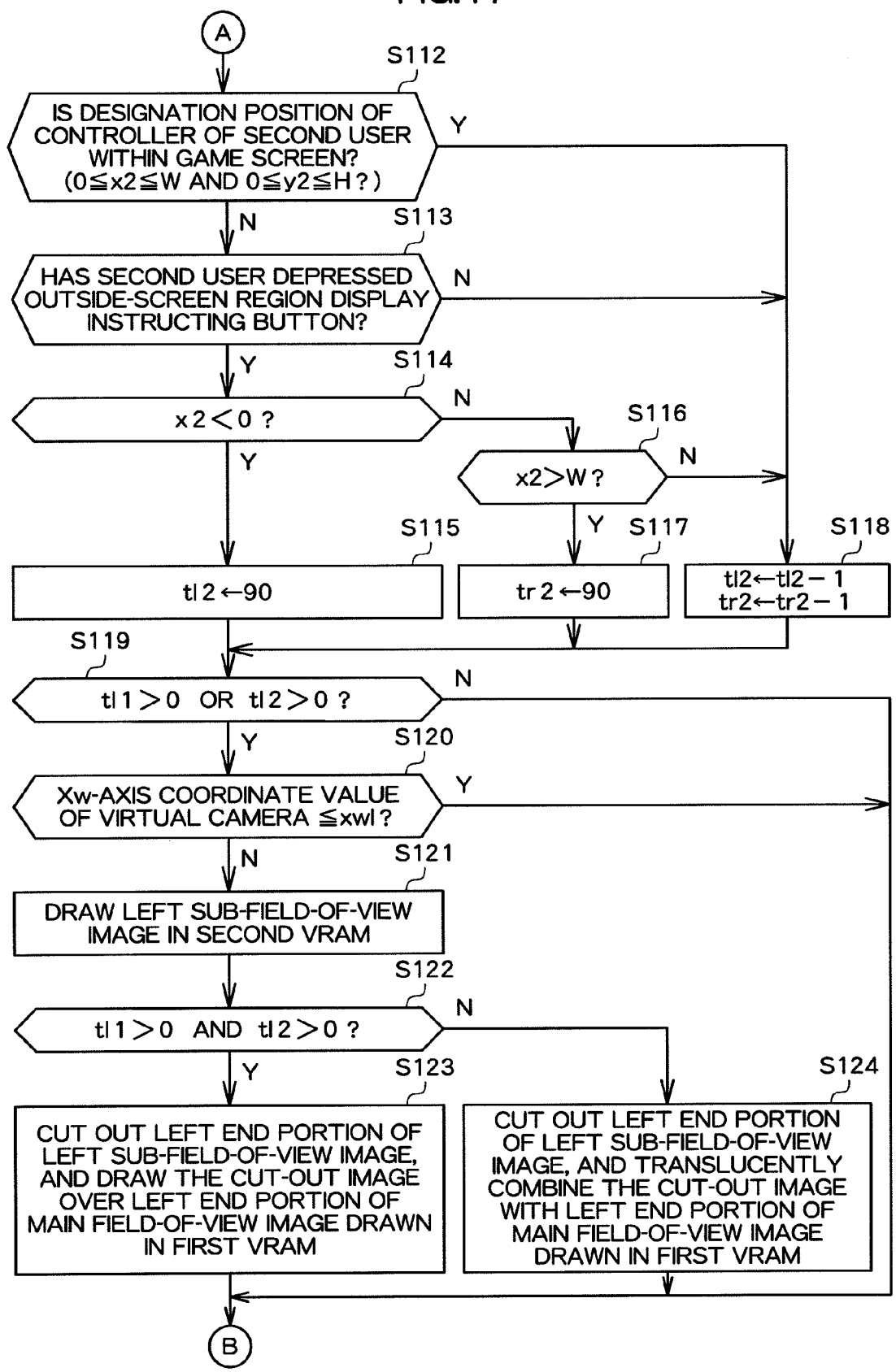
FIG. 17 is a flowchart illustrating the processing executed on the game device.
Figure 18:
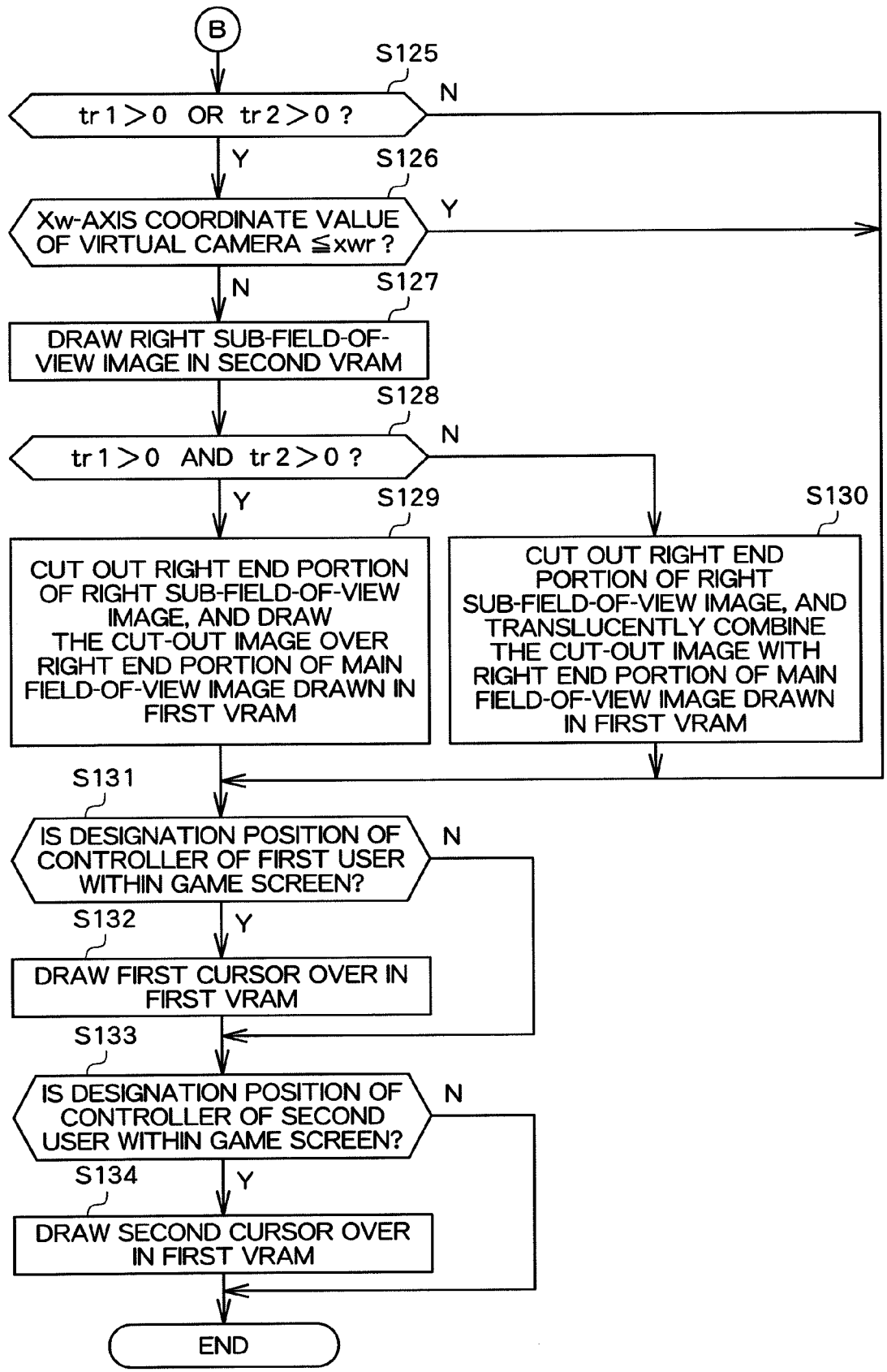
FIG. 18 is a flowchart illustrating the processing executed on the game device.

Next, description is made of processing executed by the game device 10 in order to implement the above-mentioned functional blocks. FIGS. 16 to 18 are flowcharts mainly illustrating processing related to the outside-screen position designation function among various processing executed by the game device 10 every predetermined time (in this embodiment, $1/60^{th}$ of a second). The various processing is implemented by the game device 10 (microprocessor 14) executing a program read from the optical disk 25.

As illustrated in FIG. 16, the game device 10 first judges the operation state of the controller 32 of the first user based on the operation signal supplied from the controller 32 (S101). For example, the game device 10 acquires a screen coordinate value (x1, y1) of the designation position of the controller 32 of the first user. Then, the game device 10 judges the operation state of the controller 32 of the second user based on the operation signal supplied from the controller 32 (S102). For example, the game device 10 acquires a screen coordinate value (x2, y2) of the designation position of the controller 32 of the second user.

After that, the game device 10 updates the game situation information (S103). For example, the display position information on the first cursor 70 is updated based on the screen coordinate value (x1, y1) acquired in Step S101, and the display position information on the second cursor 72 is updated based on the screen coordinate value (x2, y2) acquired in Step S102. Further, for example, the state information on the player object 58 of the first user's operation subject is updated based on the designation position of the controller 32 and the depression state of each button, which have been acquired in Step S101, and the state information on other player objects 58 belonging to a first team is updated according to a predetermined algorithm. Further, for example, the state information on the player object 58 of the second user's operation subject is updated based on the designation position of the controller 32 and the depression state of each button, which have been acquired in Step S102, and the state information on other player objects 58 belonging to a second team is updated according to a predetermined algorithm. In addition, the state information on the ball object 60, the state information on the virtual camera 62, and information that indicates an elapsed time and scoring situations of both the teams are updated.

When the updating of the game situation information is completed, the game device 10 executes processing for generating the game screen 18a in a VRAM (first VRAM). First, the game device 10 coordinate-transforms vertex coordinates of each object located in the virtual three-dimensional space 50 from the world coordinate system to the screen coordinate system by using a predetermined coordinate transformation calculation, to thereby draw the image (main field-of-view image 77) showing the state of the virtual three-dimensional space 50 viewed from the virtual camera 62 in the first VRAM (S104). That is, the game device 10 executes geometry processing to perform a coordinate transformation from the world coordinate system to a viewpoint coordinate system. The viewpoint coordinate system represents a coordinate system in which the origin point is set to the viewpoint with the viewing direction set to a Zw-axis direction. In addition, the game device 10 also performs clipping processing. Further, the game device 10 coordinate-transforms each object within a field-of-view range from the viewpoint coordinate system to the screen coordinate system. Accordingly, the game device 10 draws the main field-of-view image 77 in the first VRAM.

Subsequently, the game device 10 judges whether or not the designation position of the controller 32 of the first user is within the game screen 18a (S105). That is, the game device 10 judges whether or not the screen coordinate value (x1, y1) acquired in Step S101 is included within the diagonally shaded region illustrated in FIG. 4. To be specific, the game device 10 judges whether or not the coordinate "x1" is equal to or larger than 0 and equal to or smaller than W, and the coordinate "y1" is equal to or larger than 0 and equal to or smaller than H.

If the designation position of the controller 32 of the first user is not within the game screen 18a, the game device 10 judges whether or not the outside-screen region display instructing button has been depressed by the first user (S106). If the outside-screen region display instructing button is depressed by the first user, the game device 10 judges whether or not the coordinate "x1" is smaller than 0 (S107). If the coordinate "x1" is smaller than 0 (that is, if the front end portion 32a of the controller 32 of the first user is aimed at the left outside of the game screen 18a), the game device 10 initializes a value of the variable "tl1" to 90 (S108). Meanwhile, if the coordinate "x1" is not smaller than 0, the game device 10 judges whether or not the coordinate "x1" is larger than W (S109). If the coordinate "x1" is larger than W (that is, if the front end portion 32a of the controller 32 of the first user is aimed at the right outside of the game screen 18a), the game device 10 initializes a value of the variable "tr1" to 90 (s110).

Here, the variable "tl1" is used for monitoring whether or not a predetermined time (in this embodiment, 1.5 seconds) has elapsed since the first user depressed the outside-screen region display instructing button with the front end portion 32a of the controller 32 being aimed at the left outside (for example, point P2; see FIG. 2) of the game screen 18a. In a similar manner, the variable "tr1" is used for monitoring whether or not a predetermined time has elapsed since the first user depressed the outside-screen region display instructing button with the front end portion 32a of the controller 32 being aimed at the right outside (for example, point P3; see FIG. 2) of the game screen 18a. The variables "tl1" and "tr1" each represent a remaining time before the predetermined time has elapsed since the first user depressed the outside-screen region display instructing button, in units of $\frac{1}{60}^{th}$ of a second.

If it is judged in Step S105 that the designation position of the controller 32 of the first user is within the game screen 18a, if it is judged in Step S106 that the outside-screen region display instructing button has not been depressed, or if it is judged in Step S109 that the coordinate "x1" is not larger than W, the game device 10 decrements each of the values of "tl1" and "tr1" by 1 (S111). In this case, if the value of "tl1" is 0, the decrement is not performed on "tl1". In a similar manner, if the value of "tr1" is 0, the decrement is not performed on "tr1".

After one of Steps S108, S110, and S111 has been executed, the game device 10 judges whether or not the designation position of the controller 32 of the second user is within the game screen 18a (S112). The processing of this step is executed in a similar manner to that of Step S105. That is, with regard to the screen coordinate value (x2, y2) acquired in Step S102, the game device 10 judges whether or not the coordinate "x2" is equal to or larger than 0 and equal to or smaller than W, and the coordinate "y2" is equal to or larger than 0 and equal to or smaller than H.

If the designation position of the controller 32 of the second user is not within the game screen 18a, the game device 10 judges whether or not the outside-screen region display instructing button has been depressed by the second user (S113). If the outside-screen region display instructing button is depressed by the second user, the game device 10 judges whether or not the coordinate "x2" is smaller than 0 (S114). If the coordinate "x2" is smaller than 0 (that is, if the front end portion 32a of the controller 32 of the second user is aimed at the left outside of the game screen 18a), the game device 10 initializes a value of the variable "tl2" to 90 (S115). Meanwhile, if the coordinate "x2" is not smaller than 0, the game device 10 judges whether or not the coordinate "x2" is larger than W (S116). If the coordinate "x2" is larger than W (that is, if the front end portion 32a of the controller 32 of the second user is aimed at the right outside of the game screen 18a), the game device 10 initializes a value of the variable "tr2" to 90 (S117).

Here, the variable "tl2" is used for monitoring whether or not a predetermined time (in this embodiment, 1.5 seconds) has elapsed since the second user depressed the outside-screen region display instructing button with the front end portion 32a of the controller 32 being aimed at the left outside (for example, point P2; see FIG. 2) of the game screen 18a. Further, the variable "tr2" is used for monitoring whether or not a predetermined time has elapsed since the second user depressed the outside-screen region display instructing button with the front end portion 32a of the controller 32 being aimed at the right outside (for example, point P3; see FIG. 2) of the game screen 18a. The variables "tl2" and "tr2" each represent a remaining time before the predetermined time elapses since the second user depressed the outside-screen region display instructing button, in units of $\frac{1}{60}$th of a second.

If it is judged in Step S112 that the designation position of the controller 32 of the second user is within the game screen 18a, if it is judged in Step S113 that the outside-screen region display instructing button has not been depressed, or if it is judged in Step S116 that the coordinate "x2" is not larger than W, the game device 10 decrements each of the values of "tl2" and "tr2" by 1 (S118). In this case, if the value of "tl2" is 0, the decrement is not performed on "tl2". In a similar manner, if the value of "tr2" is 0, the decrement is not performed on "tr2".

After one of Steps S115, S117, and S118 has been executed, the game device 10 judges whether or not at least one of "tl1" and "tl2" is larger than 0 (S119). Here, the case where at least one of "tl1" and "tl2" is larger than 0 represents a case where the predetermined time (in this embodiment, 1.5 seconds) has not elapsed since at least one of the first user and the second user depressed the outside-screen region display instructing button with the front end portion 32a of the controller 32 being aimed at the left outside of the game screen 18a. That is, the case where at least one of "tl1" and "tl2" is larger than 0 represents a case where the left outside region image 76l needs to be displayed on the game screen 18a.

If at least one of "tl1" and "tl2" is larger than 0, the game device 10 judges whether or not the Xw-axis coordinate value of the virtual camera 62 is equal to or smaller than "xwl" (see FIG. 10) (S120). Here, the case where the Xw-axis coordinate value of the virtual camera 62 is equal to or smaller than "xwl" represents a case where the vicinity of the goal object 54l or the corner area 56l is included in the field-of-view range of the virtual camera 62. In such a case, it is meaningless to display the left outside region image 76l, and hence the left outside region image 76l is not displayed on the game screen 18a.

Meanwhile, if the Xw-axis coordinate value of the virtual camera 62 is not equal to or smaller than "xwl", the game device 10 draws the left sub-field-of-view image 78 in a second VRAM (S121). The game device 10 coordinate-transforms the vertex coordinates of each object located in the virtual three-dimensional space 50 from the world coordinate system to the screen coordinate system by using a predetermined coordinate transformation calculation, to thereby draw the image showing the state of the virtual three-dimensional space 50 viewed from the left sub-virtual camera 64l in the second VRAM.

After that, the game device 10 judges whether or not both "tl1" and "tl2" are larger than 0 (S122). Here, the case where both "tl1" and "tl2" are larger than 0 represents a case where it has been judged at least once that the outside-screen region display instructing button has been depressed with the front end portion 32a of the controller 32 of the first user being aimed at the left outside of the game screen 18a from the predetermined time (in this embodiment, 1.5 seconds) before up to the present time, and it has also been judged at least once that the outside-screen region display instructing button has been depressed with the front end portion 32a of the controller 32 of the second user being aimed at the left outside of the game screen 18a from the predetermined time before up to the present time.

If one of "tl1" and "tl2" is equal to or smaller than 0, the game device 10 cuts out the left end portion 78l of the left sub-field-of-view image 78 drawn in the second VRAM as the left outside region image 76l, and translucently combines the left outside region image 76l with the left end portion 77l of the main field-of-view image 77 drawn in the first VRAM (S124). At this time, an alpha value is set for the left outside region image 76l. The alpha value is information representing a transmittance. In the case of this embodiment, the alpha value can be set to an integer value equal to or larger than 0 and equal to or smaller than 255. If the alpha value is 0, the left outside region image 76l is in a completely transparent state, while if the alpha value is 255, the left outside region image 76l is in a completely opaque state. That is, as the alpha value increases, the transmittance of the left outside region image 76l decreases. In this step, the alpha value of the left outside region image 76l is set to, for example, 128.

Meanwhile, if both "tl1" and "tl2" are larger than 0, the game device 10 cuts out the left end portion 78l of the left sub-field-of-view image 78 drawn in the second VRAM as the left outside region image 76l, and draws the left outside region image 76l over the left end portion 77l of the main field-of-view image 77 drawn in the first VRAM (S123). For example, the game device 10 sets the alpha value of the left outside region image 76l to 255, and translucently combines the left outside region image 76l with the left end portion 77l of the main field-of-view image 77 drawn in the first VRAM.

In this case, an opacity of the left outside region image 76l is set higher than in the case of Step S124.

Accordingly, in this embodiment, the composition manner information (for example, information indicating which of the translucent composition and the opaque composition has been performed, or information representing the alpha value), which indicates the manner in which the left outside region image 76l is combined with the main field-of-view image 77, is held in association with the judgment result condition related to the judgment result (Steps S105 to S107 of FIG. 16) of whether or not the outside-screen region display instructing button has been depressed with the front end portion 32a of the controller 32 of the first user being aimed at the left outside of the game screen 18a from the predetermined time (in this embodiment, 1.5 seconds) before up to the present time, and the judgment result (Steps S112 to S114 of FIG. 17) of whether or not the outside-screen region display instructing button has been depressed with the front end portion 32a of the controller 32 of the second user being aimed at the left outside of the game screen 18a from the predetermined time before up to the present time.

When the processing of Steps S119 to S124 is completed, the game device 10 judges whether or not at least one of "tr1" and "tr2" is larger than 0 (S125). Here, the case where at least one of "tr1" and "tr2" is larger than 0 represents a case where the predetermined time (in this embodiment, 1.5 seconds) has not elapsed since at least one of the first user and the second user depressed the outside-screen region display instructing button with the front end portion 32a of the controller 32 being aimed at the right outside of the game screen 18a. That is, the case where at least one of "tr1" and "tr2" is larger than 0 represents a case where the right outside region image 76r needs to be displayed on the game screen 18a.

If at least one of "tr1" and "tr2" is larger than 0, the game device 10 judges whether or not the Xw-axis coordinate value of the virtual camera 62 is equal to or larger than "xwr" (see FIG. 10) (S126). Here, the case where the Xw-axis coordinate value of the virtual camera 62 is equal to or larger than "xwr" represents a case where the vicinity of the goal object 54r or the corner area 56r is included in the field-of-view range of the virtual camera 62. In such a case, it is meaningless to display the right outside region image 76r, and hence the right outside region image 76r is not displayed on the game screen 18a.

Meanwhile, if the Xw-axis coordinate value of the virtual camera 62 is not equal to or larger than "xwr", the game device 10 draws the right sub-field-of-view image in the second VRAM (S127). The game device 10 coordinate-transforms the vertex coordinates of each object located in the virtual three-dimensional space 50 from the world coordinate system to the screen coordinate system by using a predetermined coordinate transformation calculation, to thereby draw the image showing the state of the virtual three-dimensional space 50 viewed from the right sub-virtual camera 64r in the second VRAM.

After that, the game device 10 judges whether or not both "tr1" and "tr2" are larger than 0 (S128). Here, the case where both "tr1" and "tr2" are larger than 0 represents a case where it has been judged at least once that the outside-screen region display instructing button has been depressed with the front end portion 32a of the controller 32 of the first user being aimed at the right outside of the game screen 18a from the predetermined time (in this embodiment, 1.5 seconds) before up to the present time, and it has also been judged at least once that the outside-screen region display instructing button has been depressed with the front end portion 32a of the controller 32 of the second user being aimed at the right outside of the game screen 18*a* from the predetermined time before up to the present time.

If one of "tr1" and "tr2" is equal to or smaller than 0, the game device 10 cuts out the right end portion of the right sub-field-of-view image drawn in the second VRAM as the right outside region image 76*r*, and translucently combines the right outside region image 76*r* with the right end portion 77*r* of the main field-of-view image 77 drawn in the first VRAM (S130). In this step, the alpha value of the right outside region image 76*r* is set to, for example, 128.

Meanwhile, if both "tr1" and "tr2" are larger than 0, the game device 10 cuts out the right end portion of the right sub-field-of-view image drawn in the second VRAM as the right outside region image 76*r*, and draws the right outside region image 76*r* over the right end portion 77*r* of the main field-of-view image 77 drawn in the first VRAM (S129). For example, the game device 10 sets the alpha value of the right outside region image 76*r* to 255, and translucently combines the right outside region image 76*r* with the right end portion 77*r* of the main field-of-view image 77 drawn in the first VRAM. In this case, the opacity of the right outside region image 76*r* is set higher than in the case of Step S130.

Accordingly, in this embodiment, the composition manner information (for example, information indicating which of the translucent composition and the opaque composition has been performed or information representing the alpha value), which indicates the manner in which the right outside region image 76*r* is combined with the main field-of-view image 77, is held in association with the judgment result condition related to the judgment result (Steps S105 to S107 of FIG. 16) of whether or not the outside-screen region display instructing button has been depressed with the front end portion 32*a* of the controller 32 of the first user being aimed at the right outside of the game screen 18*a* from the predetermined time (in this embodiment, 1.5 seconds) before up to the present time, and the judgment result (Steps S112 to S114 of FIG. 17) of whether or not the outside-screen region display instructing button has been depressed with the front end portion 32*a* of the controller 32 of the second user being aimed at the right outside of the game screen 18*a* from the predetermined time before up to the present time.

When the processing of Steps S125 to S130 is completed, the game device 10 judges whether or not the designation position of the controller 32 of the first user is within the game screen 18*a* (S131). The processing of this step is executed in a similar manner to that of Step S105. If the designation position of the controller 32 of the first user is within the game screen 18*a*, the game device 10 draws the first cursor 70 over the image drawn in the first VRAM (S132). At this time, a drawing position of the first cursor 70 is identified based on the display position information on the first cursor 70.

Subsequently, the game device 10 judges whether or not the designation position of the controller 32 of the second user is within the game screen 18*a* (S133). The processing of this step is executed in a similar manner to that of Step S112. If the designation position of the controller 32 of the second user is within the game screen 18*a*, the game device 10 draws the second cursor 72 over the image drawn in the first VRAM (S134). At this time, a drawing position of the second cursor 72 is identified based on the display position information on the second cursor 72.

The image formed in the first VRAM in the manner as described above is displayed on the monitor 18 at a given timing. Accordingly, for example, the game screen 18*a* such as illustrated in FIGS. 6 to 8, 12, and 13 is displayed on the monitor 18.

Figure 19:
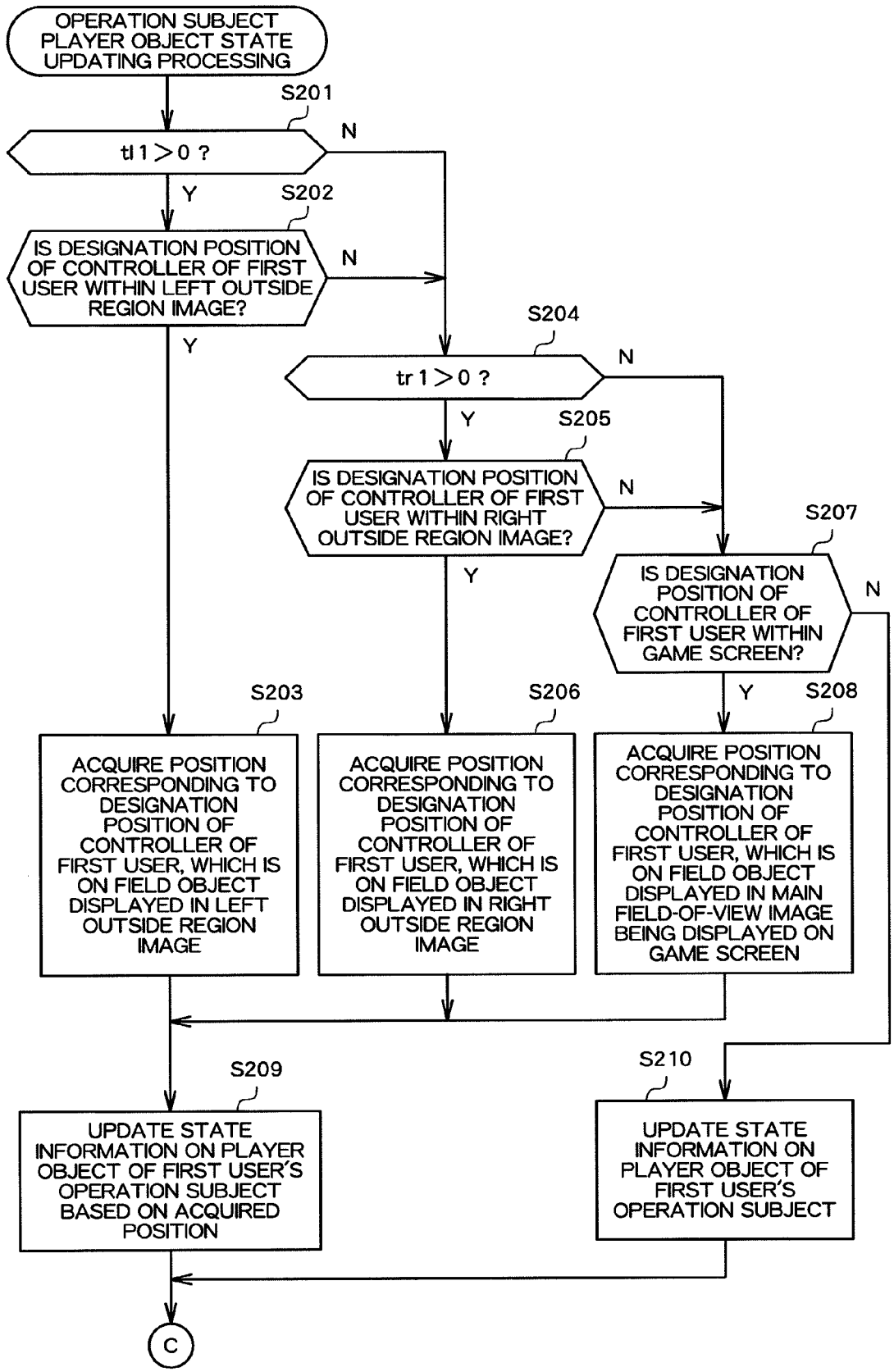
FIG. 19 is a flowchart illustrating processing executed on the game device.
Figure 20:
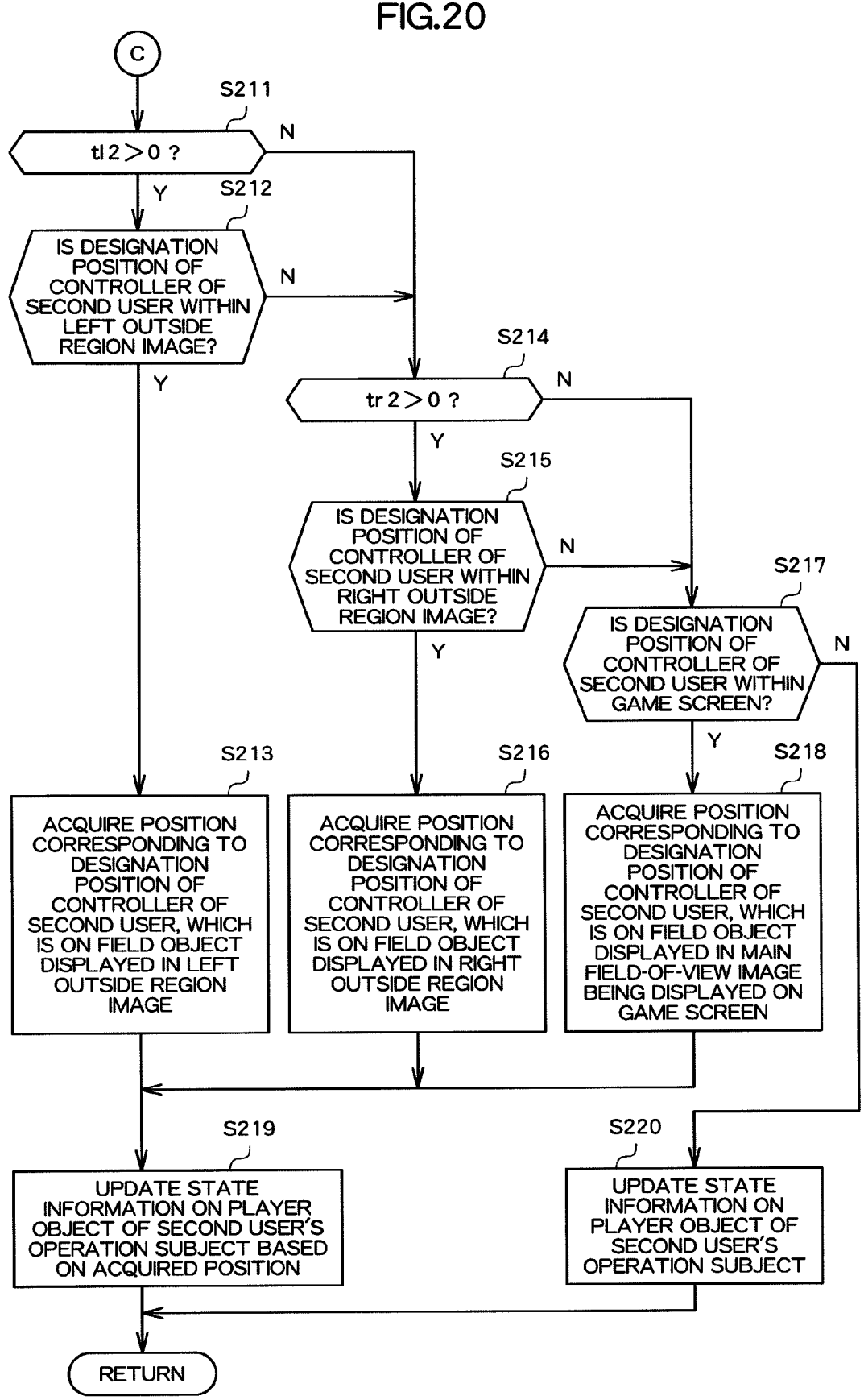
FIG. 20 is a flowchart illustrating the processing executed on the game device.

Herein, the processing of Step S103 (update processing for the game situation information) is described in more detail. Herein, in particular, description is given of a processing (operation subject player object state updating processing) of updating state information on the player objects 58 of the first user's and second user's operation subjects. FIGS. 19 and 20 are flowcharts illustrating the operation subject player object state updating processing.

First, the game device 10 updates the state information on the player object 58 of the first user's operation subject. That is, the game device 10 judges whether or not the value of the variable "tl1" is larger than 0 (S201). Here, the case where the value of the variable "tl1" is larger than 0 represents a case where the predetermined time (in this embodiment, 1.5 seconds) has not elapsed since the first user depressed the outside-screen region display instructing button with the front end portion 32*a* of the controller 32 being aimed at the left outside of the game screen 18*a*. That is, the case where the value of the variable "tl1" is larger than 0 represents a case where the left outside region image 76*l* is displayed on the game screen 18*a* and where the first user can designate a position on the field object 52 displayed in the left outside region image 76*l* as the movement target position or the kick target position for the player object 58.

If the value of the variable "tl1" is larger than 0, the game device 10 judges whether or not the designation position of the controller 32 of the first user is within the left outside region image 76*l* (S202). That is, the game device 10 judges whether or not the X-axis coordinate value (x1) of the designation position of the controller 32 of the first user is equal to or larger than 0 and equal to or smaller than W/4 with the Y-axis coordinate value (y1) being equal to or larger than 0 and equal to or smaller than H. If the designation position of the controller 32 of the first user is within the left outside region image 76*l*, the game device 10 acquires a position corresponding to the designation position of the controller 32 of the first user, which is the position on the field object 52 displayed in the left outside region image 76*l* being displayed on the game screen 18*a* (S203). Note that processing (corresponding position acquisition processing) for acquiring the position on the field object 52 corresponding to the designation position of the controller 32 will be described later.

Meanwhile, if the value of the variable "tl1" is not larger than 0, or if the designation position of the controller 32 of the first user is not within the left outside region image 76*l*, the game device 10 judges whether or not the value of the variable "tr1" is larger than 0 (S204). Here, the case where the value of the variable "tr1" is larger than 0 represents a case where a predetermined time (in this embodiment, 1.5 seconds) has not elapsed since the first user depressed the outside-screen region display instructing button with the front end portion 32*a* of the controller 32 being aimed at the right outside of the game screen 18*a*. That is, the case where the value of the variable "tr1" is larger than 0 represents a case where the right outside region image 76*r* is displayed on the game screen 18*a* and where the first user can designate a position on the field object 52 displayed in the right outside region image 76*r* as the movement target position or the kick target position for the player object 58.

If the value of the variable "tr1" is larger than 0, the game device 10 judges whether or not the designation position of the controller 32 of the first user is within the right outside region image 76*r* (S205). That is, the game device 10 judges whether or not the X-axis coordinate value (x1) of the designation position of the controller 32 of the first user is equal to or larger than W*(¾) and equal to or smaller than W with the Y-axis coordinate value (y1) being equal to or larger than 0 and equal to or smaller than H. Note that "*" is the multiplication operator. If the designation position of the controller 32 of the first user is within the right outside region image 76r, the game device 10 acquires a position corresponding to the designation position of the controller 32 of the first user, which is the position on the field object 52 displayed in the right outside region image 76r being displayed on the game screen 18a (S206).

Meanwhile, if it is judged that the value of the variable "tr1" is not larger than 0, or if the designation position of the controller 32 of the first user is not within the right outside region image 76r, the game device 10 judges whether or not the designation position of the controller 32 of the first user is within the game screen 18a (S207). The processing of this step is executed in a similar manner to that of Step S105 of FIG. 16. If the designation position of the controller 32 of the first user is within the game screen 18a, the game device 10 acquires a position corresponding to the designation position of the controller 32 of the first user, which is the position on the field object 52 displayed in the main field-of-view image 77 being displayed on the game screen 18a (S208).

If the designation position of the controller 32 of the first user is not within the game screen 18a, the state information on the player object 58 of the first user's operation subject is updated without the acquisition of the position on the field object 52 corresponding to the designation position of the controller 32 of the first user (S210). For example, the game device 10 updates the position of the player object 58 of the first user's operation subject, which is held in the player object information table, to a position to which the player object 58 is to be moved from the current position in the moving direction of the player object 58 held in the player object information table by a movement distance based on the moving speed of the player object 58 held in the player object information table.

Meanwhile, if the processing of Step S203, S206, or S208 is executed, based on the position acquired in Step S203, S206, or S208, the game device 10 updates the state information on the player object 58 of the first user's operation subject (S209).

For example, the game device 10 acquires a direction from the current position of the player object 58 of the first user's operation subject toward the position acquired in Step S203, S206, or S208. Then, the game device 10 updates the moving direction of the player object 58 of the first user's operation subject, which is held in the player object information table, to the acquired direction. Further, the game device 10 updates the position of the player object 58 of the first user's operation subject, which is held in the player object information table, to the position to which the player object 58 is to be moved from the current position in the moving direction of the player object 58 held in the player object information table by a movement distance based on the moving speed of the player object 58 held in the player object information table.

Further, for example, the game device 10 judges whether or not the movement target position setting button has been depressed. Then, if it is judged that the movement target position setting button has been depressed, the game device 10 updates the movement target position of the player object 58 of the first user's operation subject, which is held in the player object information table, to the position acquired in Step S203, S206, or S208. Further, the game device 10 acquires the direction from the current position of the player object 58 of the first user's operation subject toward the position acquired in Step S203, S206, or S208. Then, the game device 10 updates the moving direction of the player object 58 of the first user's operation subject, which is held in the player object information table, to the acquired direction. In addition, the game device 10 updates the position of the player object 58 of the first user's operation subject, which is held in the player object information table, to the position to which the player object 58 is to be moved from the current position in the moving direction of the player object 58 held in the player object information table by the movement distance based on the moving speed of the player object 58 held in the player object information table.

Further, for example, the game device 10 judges whether or not the kick instructing button has been depressed. Then, if it is judged that the kick instructing button has been depressed, the game device 10 updates the motion data during reproduction for the player object 58 of the first user's operation subject, which is held in the player object information table, to kicking action motion data, and also updates the motion data reproducing position to an initial position. At this time, the game device 10 updates the state information on the ball object 60 in order to cause the ball object 60 to start moving toward the position acquired in Step S203, S206, or S208.

When the updating of the state information on the player object 58 of the first user's operation subject is completed, the game device 10 updates the state information on the player object 58 of the second user's operation subject. First, the game device 10 judges whether or not the value of the variable "tl2" is larger than 0 (S211). Here, the case where the value of the variable "tl2" is larger than 0 represents a case where the predetermined time (in this embodiment, 1.5 seconds) has not elapsed since the second user depressed the outside-screen region display instructing button with the front end portion 32a of the controller 32 being aimed at the left outside of the game screen 18a. That is, the case where the variable "tl2" is larger than 0 represents a case where the left outside region image 76l is displayed on the game screen 18a and where the second user can designate a position on the field object 52 displayed in the left outside region image 76l as the movement target position or the kick target position for the player object 58.

If the value of the variable "tl2" is larger than 0, the game device 10 judges whether or not the designation position of the controller 32 of the second user is within the left outside region image 76l (S212). That is, the game device 10 judges whether or not the X-axis coordinate value (x2) of the designation position of the controller 32 of the second user is equal to or larger than 0 and equal to or smaller than W/4 with the Y-axis coordinate value (y2) being equal to or larger than 0 and equal to or smaller than H. If the designation position of the controller 32 of the second user is within the left outside region image 76l, the game device 10 acquires a position corresponding to the designation position of the controller 32 of the second user, which is the position on the field object 52 displayed in the left outside region image 76l being displayed on the game screen 18a (S213).

Meanwhile, if the value of the variable "tl2" is not larger than 0, or if the designation position of the controller 32 of the second user is not within the left outside region image 76l, the game device 10 judges whether or not the value of the variable "tr2" is larger than 0 (S214). Here, the case where the value of the variable "tr2" is larger than 0 represents a case where a predetermined time (in this embodiment, 1.5 seconds) has not elapsed since the second user depressed the outside-screen region display instructing button with the front end portion 32a of the controller 32 being aimed at the right outside of the game screen 18a. That is, the case where the value of the variable "tr2" is larger than 0 represents a case where the right outside region image 76r is displayed on the game screen 18a and where the second user can designate a position on the field object 52 displayed in the right outside region image 76r as the movement target position or the kick target position for the player object 58.

If the value of the variable "tr2" is larger than 0, the game device 10 judges whether or not the designation position of the controller 32 of the second user is within the right outside region image 76r (S215). That is, the game device 10 judges whether or not the X-axis coordinate value (x2) of the designation position of the controller 32 of the second user is equal to or larger than W*(¾) and equal to or smaller than W with the Y-axis coordinate value (y2) being equal to or larger than 0 and equal to or smaller than H. If the designation position of the controller 32 of the second user is within the right outside region image 76r, the game device 10 acquires a position corresponding to the designation position of the controller 32 of the second user, which is the position on the field object 52 displayed in the right outside region image 76r being displayed on the game screen 18a (S216).

Meanwhile, if it is judged that the value of the variable "tr2" is not larger than 0, or if the designation position of the controller 32 of the second user is not within the right outside region image 76r, the game device 10 judges whether or not the designation position of the controller 32 of the second user is within the game screen 18a (S217). The processing of this step is executed in a similar manner to that of Step S112. If the designation position of the controller 32 of the second user is within the game screen 18a, the game device 10 acquires a position corresponding to the designation position of the controller 32 of the second user, which is the position on the field object 52 displayed in the main field-of-view image 77 being displayed on the game screen 18a (S218).

If the designation position of the controller 32 of the second user is not within the game screen 18a, the state information on the player object 58 of the second user's operation subject is updated without the acquisition of the position on the field object 52 corresponding to the designation position of the controller 32 of the second user (S220). The processing of this step is executed in a similar manner to that of Step S210.

Meanwhile, if the processing of Step S213, S216, or S218 is executed, based on the position acquired in Step S213, S216, or S218, the game device 10 updates the state information on the player object 58 of the second user's operation subject (S219). The processing of this step is executed in a similar manner to that of Step S209.

Figure 21:
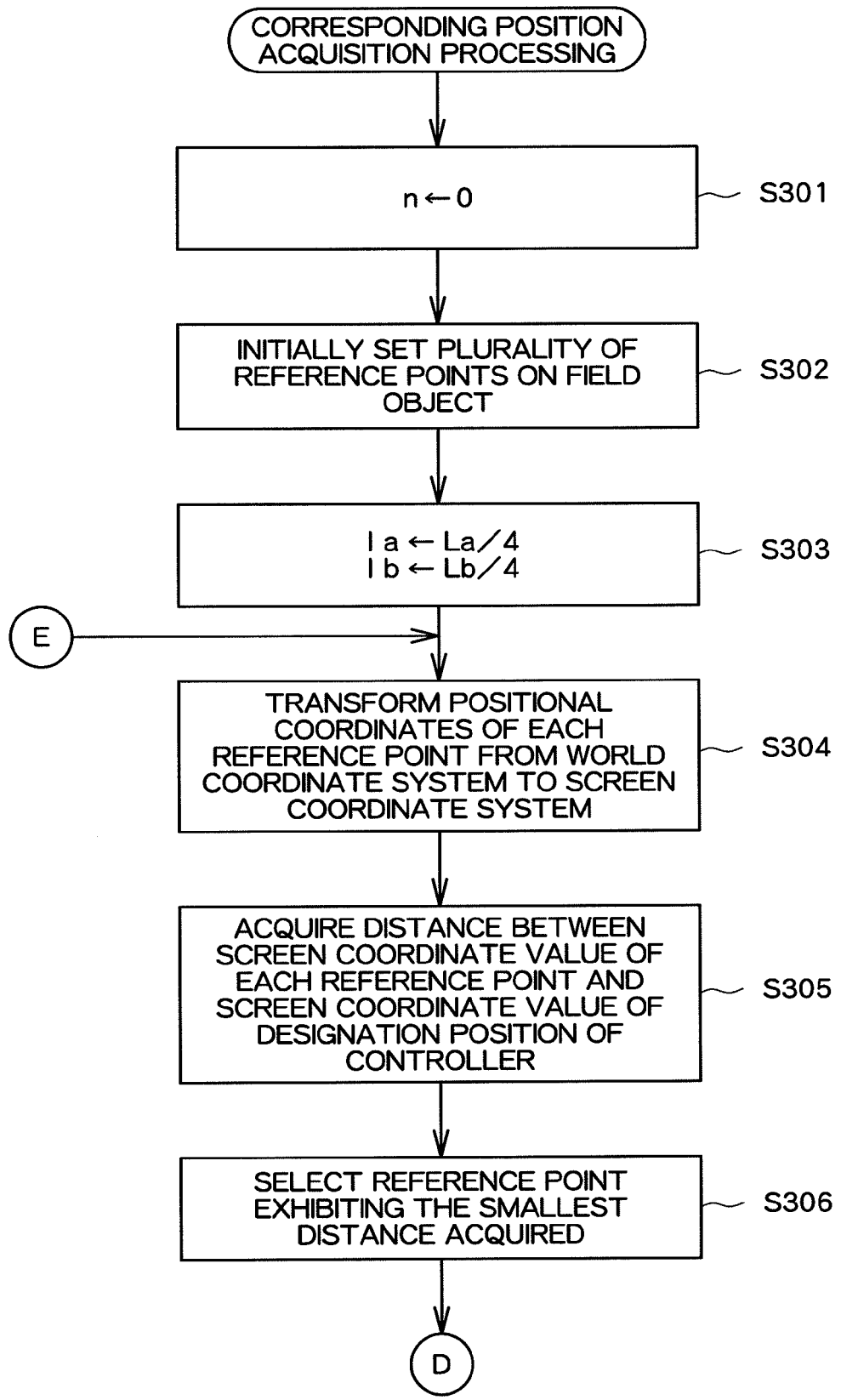
FIG. 21 is a flowchart illustrating processing executed on the game device.
Figure 22:
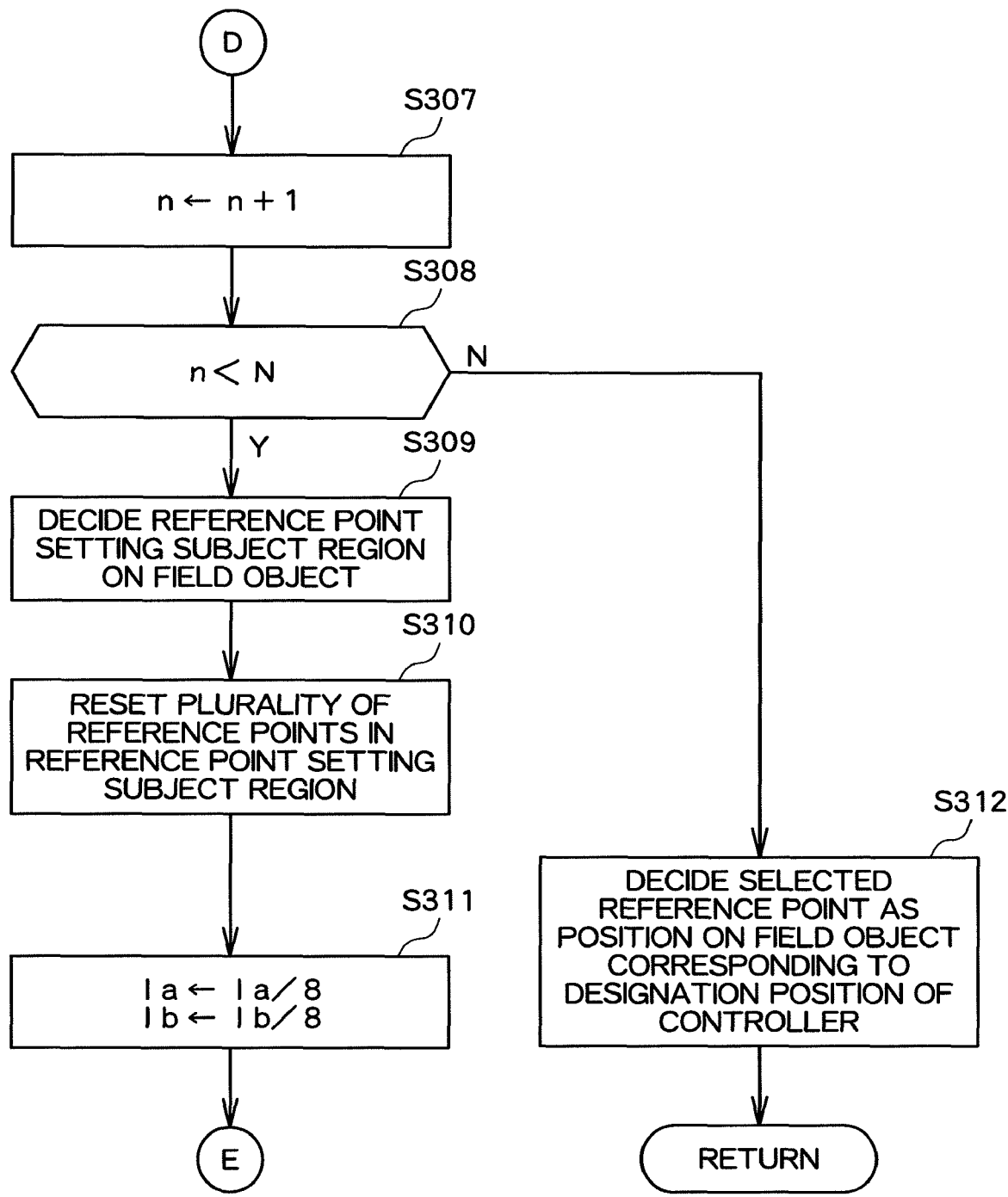
FIG. 22 is a flowchart illustrating the processing executed on the game device.

Herein, description is given of processing (corresponding position acquisition processing) for acquiring the position on the field object 52 corresponding to the designation position of the controller 32. FIGS. 21 and 22 are flowcharts illustrating the corresponding position acquisition processing.

Figure 23:
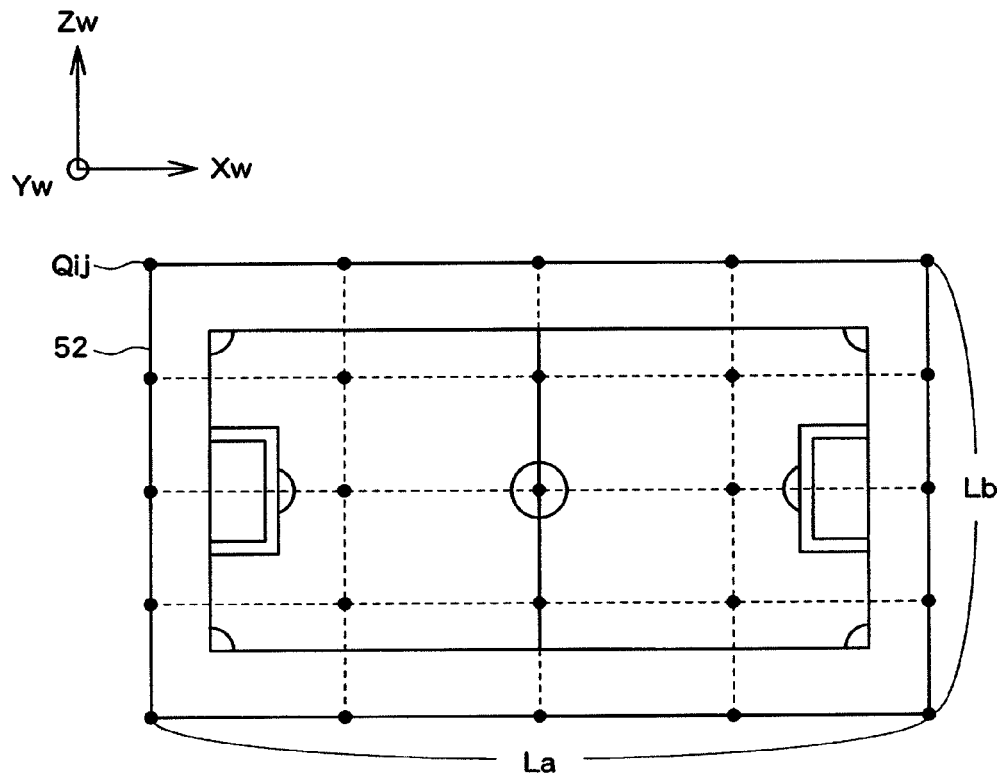
FIG. 23 is a diagram for describing an initial setting of a reference point.

As illustrated in FIG. 21, the game device 10 first initializes a value of a variable "n" to 0 (S301). Further, the game device 10 initially sets a plurality of reference points on the field object 52 (S302). FIG. 23 is a diagram for describing the initial setting of the reference points. As illustrated in FIG. 23, the game device 10 acquires each vertex of blocks obtained by dividing each of the sides of the field object 52 into four along a long-side direction and a short-side direction, as a reference point $Q_{ij}$ (where "i" and "j" are each an integer selected from 1 to 5). Here, the reference point $Q_{11}$ denotes a reference point on the top left, while the reference point $Q_{15}$ denotes a reference point on the top right. Similarly, the reference point $Q_{51}$ denotes a reference point on the bottom left, while the reference point $Q_{55}$ denotes a reference point on the bottom right.

Further, the game device 10 initializes a variable "la" to La/4, and initializes a variable "lb" to Lb/4 (S303). Here, as illustrated in FIG. 23, "La" denotes a length of a long side of the field object 52, while "Lb" denotes a length of a short side of the field object 52.

After that, the game device 10 transforms positional coordinates of each reference point $Q_{ij}$ from the world coordinate system to the screen coordinate system to thereby acquire the screen coordinate value corresponding to each reference point $Q_{ij}$ (S304). Note that in a case of acquiring a position corresponding to the designation position of the controller 32 of the first user, which is the position on the field object 52 displayed in the left outside region image 76l being displayed on the game screen 18a (S203 of FIG. 19 or S213 of FIG. 20), in Step S304, the same coordinate transformation calculation is used as the coordinate transformation calculation used to generate the left sub-field-of-view image 78 being displayed on the game screen 18a (S121 of FIG. 17). Further, in a case of acquiring a position corresponding to the designation position of the controller 32 of the first user, which is the position on the field object 52 displayed in the right outside region image 76r being displayed on the game screen 18a (S206 of FIG. 19 or S216 of FIG. 20), in Step S304, the same coordinate transformation calculation is used as the coordinate transformation calculation used to generate the right sub-field-of-view image being displayed on the game screen 18a (S127 of FIG. 18). In addition, in a case of acquiring a position corresponding to the designation position of the controller 32 of the first user, which is the position on the field object 52 displayed in the main field-of-view image 77 being displayed on the game screen 18a (S208 of FIG. 19 or S218 of FIG. 20), in Step S304, the same coordinate transformation calculation is used as the coordinate transformation calculation used to generate the main field-of-view image 77 being displayed on the game screen 18a (S104 of FIG. 16).

After that, for each reference point $Q_{ij}$, the game device 10 calculates a distance between the screen coordinate value corresponding to the reference point $Q_{ij}$ and the screen coordinate value of the designation position of the controller 32 (S305). Then, the game device 10 selects a reference point $Q_{ij}$ exhibiting the smallest distance calculated in Step S305 from among the plurality of reference points $Q_{ij}$ (S306). Further, the game device 10 adds 1 to the value of the variable "n" (S307). Then, the game device 10 judges whether or not the value of the variable "n" is smaller than "N" (S308).

Figure 24:
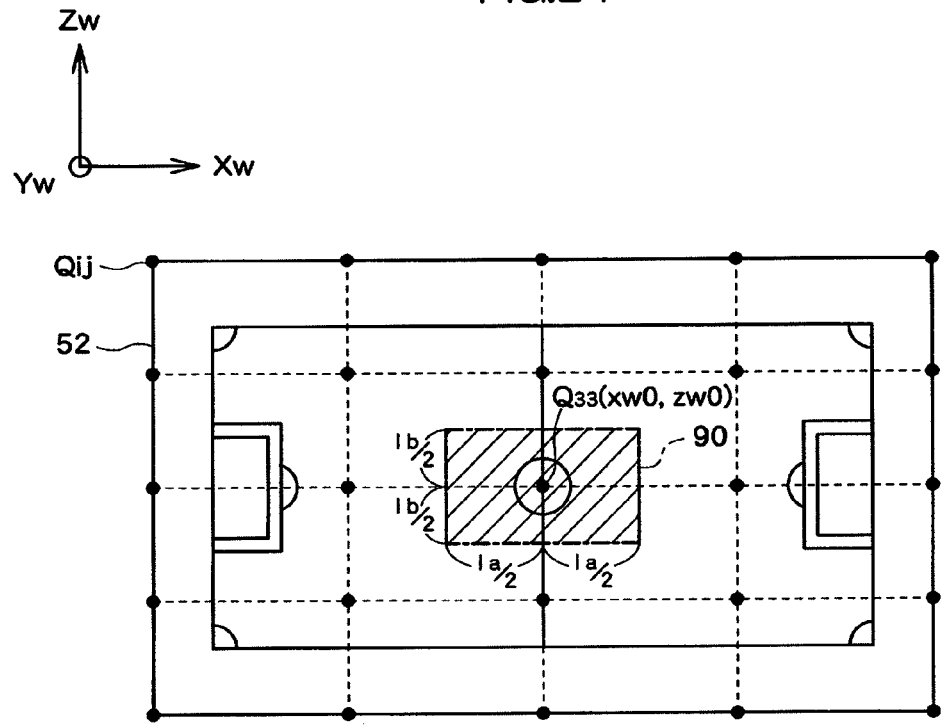
FIG. 24 is a diagram for describing a reference point setting subject region.

If the value of the variable "n" is smaller than "N", the game device 10 decides a reference point setting subject region on the field object 52 based on the reference point $Q_{ij}$ selected in Step S306 (S309). FIG. 24 is a diagram for describing the reference point setting subject region. Here, FIG. 24 illustrates the reference point setting subject region in a case where the reference point Q33 is selected in Step S306 with the reference point $Q_{ij}$ set as illustrated in FIG. 23. As illustrated in FIG. 24, the game device 10 sets a region on the field object 52, which includes the Xw-axis coordinate and the Zw-axis coordinate (xw, zw) that satisfy the following conditions (1) and (2), as a reference point setting subject region 90. Note that in the following conditions (1) and (2), (xw0, zw0) represents the Xw-axis coordinate and the Zw-axis coordinate of the reference point $Q_{ij}$ selected in Step S206, respectively.

$$xw0-(la/2) \leq xw \leq xw0+(la/2) \tag{1}$$

$$zw0-(lb/2) \leq zw \leq zw0+(lb/2) \tag{2}$$

Figure 25:
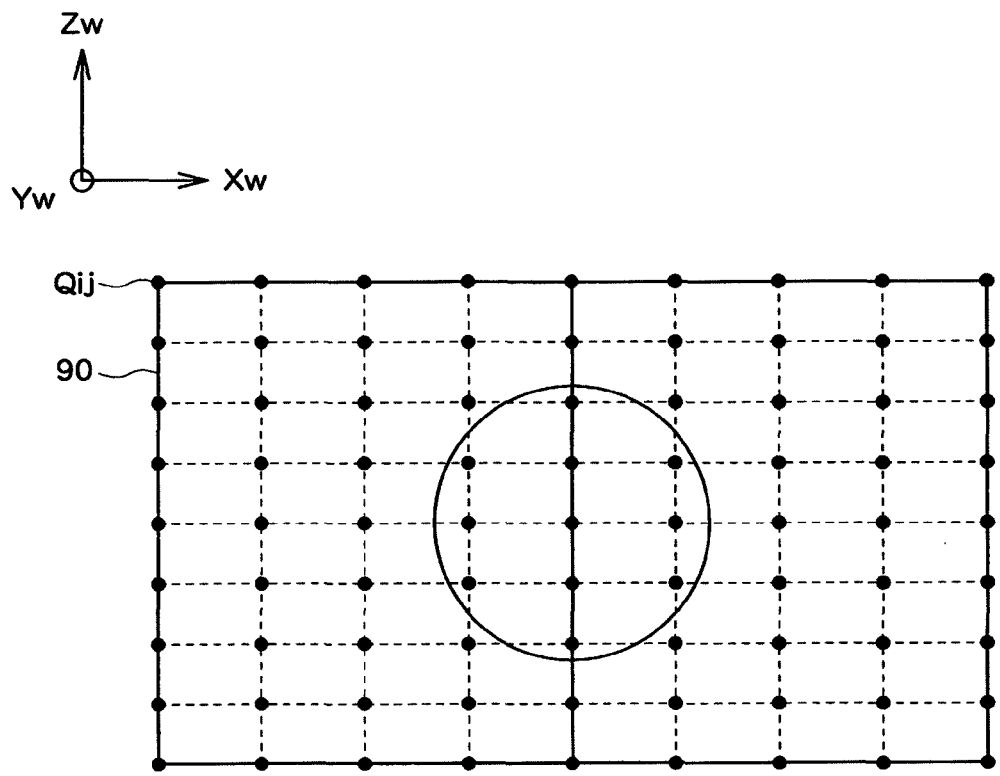
FIG. 25 is a diagram for describing resetting of the reference point.

Then, the game device 10 resets a plurality of reference points in the reference point setting subject region 90 decided in Step S309 (S310). FIG. 25 is a diagram for describing the resetting of the reference points. Here, FIG. 25 illustrates a case where the reference point setting subject region 90 is decided as illustrated in FIG. 24. As illustrated in FIG. 25, the game device 10 sets each vertex of each of blocks obtained by dividing each side of the reference point setting subject region 90 into eight along the long-side direction and the short-side direction, as a new reference point $Q_{ij}$ (where "i" and "j" are each an integer selected from 1 to 9). Here, the reference point $Q_{11}$ denotes the reference point on the top left, while the reference point $Q_{19}$ denotes the reference point on the top right. Similarly, the reference point $Q_{91}$ denotes the reference point on the bottom left, while the reference point $Q_{99}$ denotes the reference point on the bottom right.

After resetting the reference points $Q_{ij}$, the game device 10 updates the variable "la" to la/8, and updates the variable "lb" to lb/8 (S311). After that, the game device 10 again executes the processing from Step S304.

Meanwhile, if it is judged in Step S308 that the value of the variable "n" is not smaller than "N", the game device 10 judges that the reference point $Q_{ij}$ selected in Step S306 is a position on the field object 52 corresponding to the designation position of the controller 32 (S312).

According to the game device 10 described above, which is provided with the above-mentioned outside-screen position designation function, the user becomes able to cause the left outside region image 76l or the right outside region image 76r, which shows the state of the vicinity of the goal object 54l or 54r or the corner area 56l or 56r, to be displayed on the game screen 18a if the vicinity thereof is not being displayed on the game screen 18a, and to designate a position in the vicinity thereof as the movement target position or the kick target position for the player object 58.

Incidentally, in the case where the vicinity of the goal object 54l or 54r or the corner area 56l or 56r is not being displayed on the game screen 18a, in order to allow the user to designate a position in the vicinity thereof as the movement target position or the kick target position for the player object 58, for example, there is a possible method in which the virtual camera 62 itself is moved according to the designation position of the controller 32 if the controller 32 is directed toward the outside of the game screen 18a. Accordingly, the user becomes able to cause the vicinity of a desired goal object or corner area to be displayed on the game screen 18a, and hence the user becomes able to set a position in the vicinity thereof as the movement target position or the kick target position for the player object 58. However, for example, in a case where a plurality of users play the game while watching one monitor 18 (game screen 18a), it is not appropriate for one user to move the virtual camera 62 at their convenience. This is because if one user moves the virtual camera 62, the other user may become unable to designate a position within the virtual three-dimensional space 50, which was displayed on the original game screen 18a, as the movement target position or the kick target position for the player object 58. Accordingly, for example, in the case where a plurality of users play the game while watching one monitor 18, the above-mentioned method cannot be employed.

In this respect, according to this embodiment, even if one user has caused the left outside region image 76l or the right outside region image 76r to be displayed on the game screen 18a, the other user can designate a position on the field object 52 displayed in the main field-of-view image 77, which is being translucently shown under the left outside region image 76l or the right outside region image 76r, as the movement target position or the kick target position for the player object 58. Further, in the case where one user has caused the left outside region image 76l or the right outside region image 76r to be displayed on the game screen 18a, when the other user intends to designate a position on the field object 52 displayed in the left outside region image 76l or the right outside region image 76r as the movement target position or the kick target position for the player object 58, the other user depresses the outside-screen region display instructing button with the front end portion 32a of the controller 32 being aimed at the left outside or the right outside of the game screen 18a to thereby become able to designate the position on the field object 52 displayed in the left outside region image 76l or the right outside region image 76r as the movement target position or the kick target position for the player object 58. Therefore, the method (outside-screen position designation function) according to this embodiment can also be employed in the case where a plurality of users play the game while watching one monitor 18.

Note that the present invention is not limited to the embodiment described above.

For example, the region in the virtual three-dimensional space 50 displayed in the left outside region image 76l or the right outside region image 76r is not limited to the vicinity of the goal object 54l or 54r or the corner area 56l or 56r. For example, a region adjacent to the region in the virtual three-dimensional space 50 displayed in the main field-of-view image 77 may be displayed in the left outside region image 76l or the right outside region image 76r.

Figure 26:
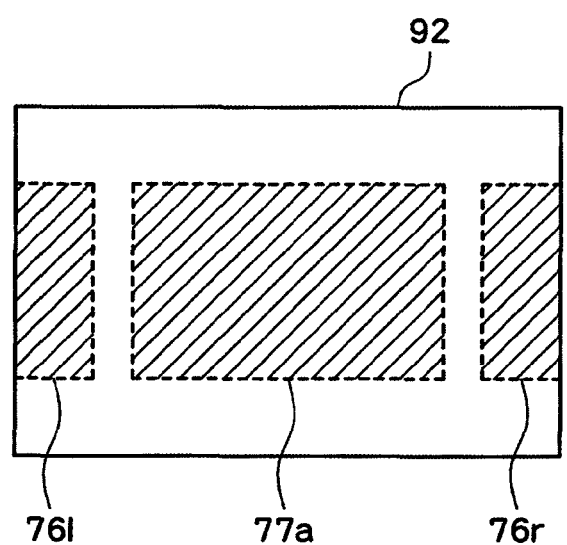
FIG. 26 is a diagram for describing a relationship among an original field-of-view image, the main field-of-view image, a left outside region image, and a right outside region image.

Further, for example, instead of separately generating the main field-of-view image 77, the left sub-field-of-view image 78 (left outside region image 76l), and the right sub-field-of-view image (right outside region image 76r), the image showing the state of the virtual three-dimensional space 50 viewed from the virtual camera 62 may be generated as an image having a larger size than a size of the game screen 18a. Herein, this field-of-view image is referred to as "original field-of-view image". FIG. 26 is a diagram for describing the original field-of-view image. In this case, for example, a central portion of an original field-of-view image 92 is cut out as a main field-of-view image 77a, serving to generate the game screen 18a. Then, if the left outside region image 76l or the right outside region image 76r is displayed on the game screen 18a, a portion other than the portion that has been cut out as the main field-of-view image 77a of the original field-of-view image 92 is cut out as the left outside region image 76l or the right outside region image 76r, serving to generate the game screen 18a. Accordingly, it becomes unnecessary to separately generate the main field-of-view image 77, the left sub-field-of-view image 78 (left outside region image 76l), and the right sub-field-of-view image (right outside region image 76r), which enables a reduction in processing load to be realized.

Further, for example, a display size of the left outside region image 76l or the right outside region image 76r may not be a fixed size. For example, the display size of the left outside region image 76l or the right outside region image 76r may be changed based on the display position of the player object 58 of the operation subject on the game screen 18a. In other words, the second display control unit 86b may store a display position condition related to the display position on the game screen 18a and display size information related to the display size of the left outside region image 76l or the right outside region image 76r, in association with each other. Then, the second display control unit 86b may judge whether or not the display position of the player object 58 of the operation subject satisfies the above-mentioned display position condition, and control the size of the left outside region image 76l or the right outside region image 76r on the game screen based on the display size information associated with the display position condition satisfied by the display position of the player object 58 of the operation subject.

The above-mentioned display position condition may be set as, for example, a condition related to a distance from the display position of the player object 58 of the operation subject to the left end or the right end of the game screen 18*a*. Further, the above-mentioned display size information may be set as, for example, information related to a width of the left outside region image 76*l* or the right outside region image 76*r*. Accordingly, if the game device 10 (second display control unit 86*b*) cuts out the left outside region image 76*l* from the left sub-field-of-view image 78 (or original field-of-view image 92) or cuts out the right outside region image 76*r* from the right sub-field-of-view image (or original field-of-view image 92), the width for the cutout may be decided based on the distance from the display position of the player object 58 of the operation subject to the left end or the right end of the game screen 18*a*. In other words, the width of the left outside region image 76*l* may be changed based on the distance from the display position of the player object 58 of the operation subject to the left end of the game screen 18*a*. In a similar manner, the width of the right outside region image 76*r* may be changed based on the distance from the display position of the player object 58 of the operation subject to the right end of the game screen 18*a*. Accordingly, in a case where there is a relatively large space between the display position of the player object 58 of the operation subject and the left end of the game screen 18*a*, for example, in such a case where the player object 58 of the operation subject is displayed on the relatively right side within the game screen 18*a*, it is possible to increase the width of the left outside region image 76*l*. In this case, for example, the state of the vicinity of the goal object 54*l* or the corner area 56*l* is displayed over a relatively wide range, which increases options when the user selects the movement target position or the kick target position for the player object 58.

Further, for example, the game executed on the game device 10 may be a game other than the soccer game. Further, the game executed on the game device 10 may be a game played by one user or a game played by three or more users. Further, the game executed on the game device 10 is not limited to the game in which the state of a three-dimensional game space constituted of three coordinate elements is displayed on the game screen 18*a*, but may be a game in which the state of a two-dimensional game space constituted of two coordinate elements is displayed on the game screen 18*a*.

Figure 27:
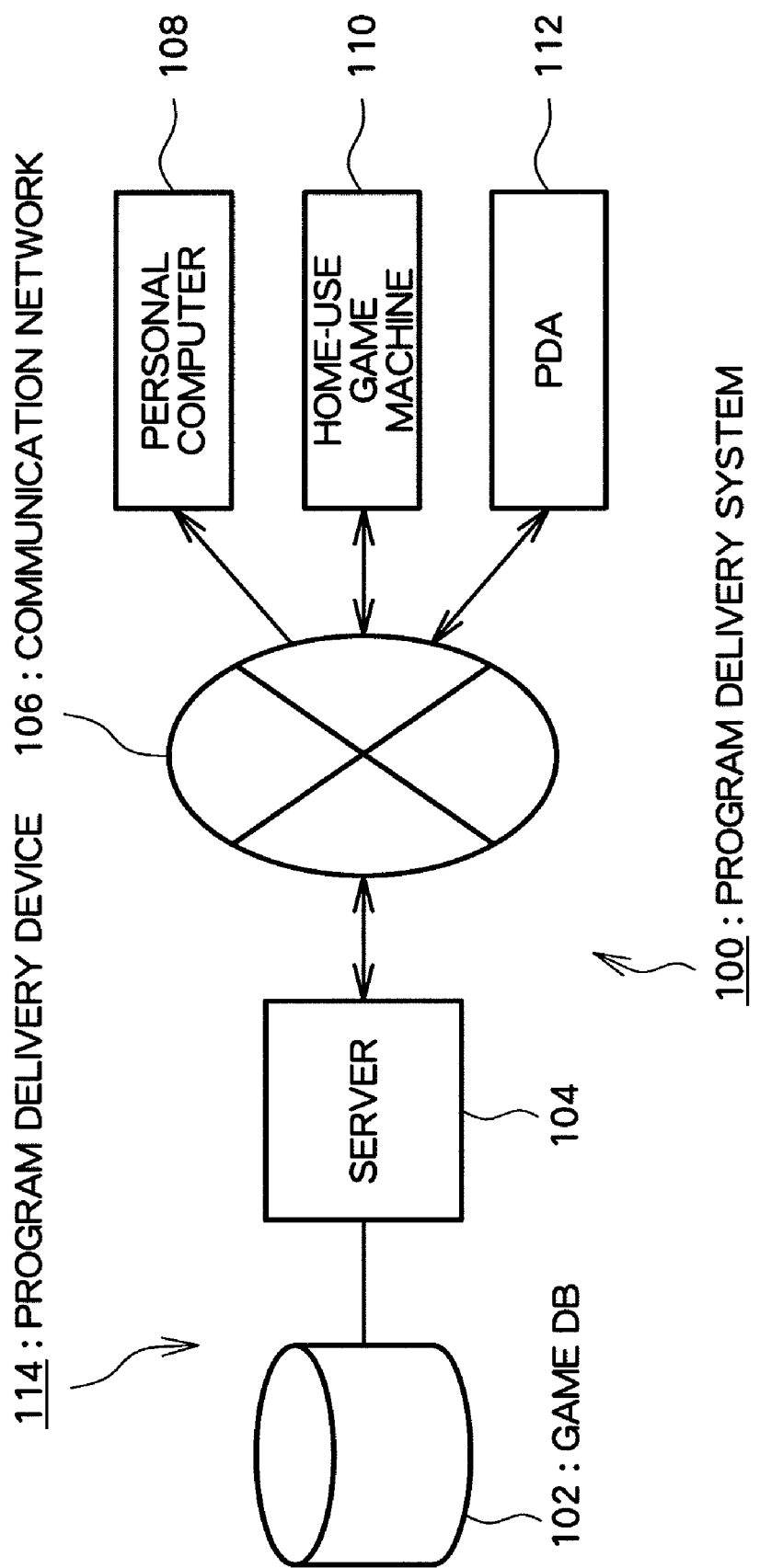
FIG. 27 is a diagram illustrating an overall configuration of a program delivery system according to another embodiment of the present invention.

Further, for example, in the above-mentioned description, the program is supplied from the optical disk 25 serving as an information storage medium to the home-use game machine 11, but the program may be delivered to a household or the like via a communication network. FIG. 27 is a diagram illustrating an overall configuration of a program delivery system using the communication network. Based on FIG. 27, description is given of a program delivery method according to the present invention. As illustrated in FIG. 27, a program delivery system 100 includes a game database 102, a server 104, a communication network 106, a personal computer 108, a home-use game machine 110, and a personal digital assistant (PDA) 112. Of those, the game database 102 and the server 104 constitute a program delivery device 114. The communication network 106 is configured by including, for example, the Internet and a cable television network. In this system, the same program as storage contents of the optical disk 25 is stored in the game database (information storage medium) 102. A demander uses the personal computer 108, the home-use game machine 110, or the PDA 112 to make a game delivery request, and hence the game delivery request is transferred to the server 104 via the communication network 106. Then, the server 104 reads the program from the game database 102 according to the game delivery request, and transmits the game delivery request to a game delivery request source such as the personal computer 108, the home-use game device 110, and the PDA 112. Here, the game delivery is performed according to the game delivery request, but the server 104 may transmit the program one way. In addition, all of programs necessary to implement the game are not necessarily delivered at one time (delivered collectively), and necessary parts may be delivered (split and delivered) depending on which phase the game is in. By thus performing the game delivery via the communication network 106, the demander can obtain the program with ease.

The invention claimed is:

1. A game device, comprising:
first display control means for causing a game screen showing a state of a first region within a virtual three-dimensional game space to be displayed;
screen coordinate value acquisition means for acquiring a screen coordinate value according to a user's operation;
first judgment means for judging whether or not the screen coordinate value acquired by the screen coordinate value acquisition means is a screen coordinate value within the game screen;
position-in-first-region acquisition means for acquiring, if it is judged that the screen coordinate value acquired by the screen coordinate value acquisition means is a screen coordinate value within the game screen, a position within the first region corresponding to the screen coordinate value acquired by the screen coordinate value acquisition means;
second display control means for causing, if it is judged that the screen coordinate value acquired by the screen coordinate value acquisition means is not a screen coordinate value within the game screen, an image showing a state of a second region within the virtual three-dimensional game space to be displayed on a part of the game screen based on a positional relationship between the screen coordinate value acquired by the screen coordinate value acquisition means and the game screen for at least a predetermined time;
second judgment means for judging, if the image showing the state of the second region is displayed, whether or not the screen coordinate value acquired by the screen coordinate value acquisition means is a screen coordinate value within a region in which the image showing the state of the second region is displayed;
position-in-second-region acquisition means for acquiring, if it is judged that the screen coordinate value acquired by the screen coordinate value acquisition means is a screen coordinate value within the region in which the image showing the state of the second region is displayed, a position within the second region corresponding to the screen coordinate value acquired by the screen coordinate value acquisition means in place of the position-in-first-region acquisition means; and
game advancing means for advancing a game based on the position acquired by the position-in-first-region acquisition means or the position-in-second-region acquisition means.

2. A game device according to claim 1, wherein:
in the first region, a game character acting according to the user's operation is located; and
the second display control means comprises:
means for storing a display position condition related to a display position on the game screen and display size information related to a display size of the image showing the state of the second region on the game screen, in association with each other; and means for causing the image showing the state of the second region to be displayed on a part of the game screen based on the display size information associated with the display position condition satisfied by the display position of the game character on the game screen.

3. A game device according to claim 1, wherein:
the screen coordinate value acquisition means acquires a screen coordinate value according to the user's operation for each of a plurality of users;

the first judgment means judges, for each of the plurality of users, whether or not the screen coordinate value according to the user's operation is a screen coordinate value within the game screen;

the second display control means, if it is judged for at least some users of the plurality of users that the screen coordinate value according to the user's operation is not a screen coordinate value within the game screen, causes the image showing the state of the second region to be displayed on the part of the game screen for at least a predetermined time;

the second judgment means judges, for each of the at least some users, whether or not the screen coordinate value according to the user's operation is a screen coordinate value within the region in which the image showing the state of the second region is displayed; and the position-in-second-region acquisition means, if it is judged for any one of the at least some users that the screen coordinate value according to the user's operation is a screen coordinate value within the region in which the image showing the state of the second region is displayed, acquires a position within the second region corresponding to the screen coordinate value according to the user's operation in place of the position-in-first-region acquisition means.

4. A game device according to claim 3, wherein:
the first display control means causes an image showing the state of the first region to be displayed; and the second display control means comprises:
means for storing: a judgment result condition related to a judgment result that has been obtained by the first judgment means for each of the plurality of users from a predetermined time before up to a present time; and composition manner information related to a manner in which the image showing the state of the second region is combined with the image showing the state of the first region, in association with each other; and means for causing an image formed by combining the image showing the state of the second region with a part of the image showing the state of the first region to be displayed on the game screen based on the composition manner information associated with the judgment result condition satisfied by the judgment result obtained by the first judgment means for each of the plurality of users from the predetermined time before up to the present time.

5. A game device control method, comprising:
a first display control step of causing a game screen showing a state of a first region within a virtual three-dimensional game space to be displayed;

a screen coordinate value acquisition step of acquiring a screen coordinate value according to a user's operation;

a first judgment step of judging whether or not the screen coordinate value acquired in the screen coordinate value acquisition step is a screen coordinate value within the game screen;

a position-in-first-region acquisition step of, if it is judged that the screen coordinate value acquired in the screen coordinate value acquisition step is a screen coordinate value within the game screen, acquiring a position within the first region corresponding to the screen coordinate value acquired in the screen coordinate value acquisition step;

a second display control step of, if it is judged that the screen coordinate value acquired in the screen coordinate value acquisition step is not a screen coordinate value within the game screen, causing an image showing a state of a second region within the virtual three-dimensional game space to be displayed on a part of the game screen based on a positional relationship between the screen coordinate value acquired in the screen coordinate value acquisition step and the game screen for at least a predetermined time;

a second judgment step of, if the image showing the state of the second region is displayed, judging whether or not the screen coordinate value acquired in the screen coordinate value acquisition step is a screen coordinate value within a region in which the image showing the state of the second region is displayed;

a position-in-second-region acquisition step of, if it is judged that the screen coordinate value acquired in the screen coordinate value acquisition step is a screen coordinate value within the region in which the image showing the state of the second region is displayed, acquiring a position within the second region corresponding to the screen coordinate value acquired in the screen coordinate value acquisition step in place of the position-in-first-region acquisition step; and a game advancing step of advancing a game based on the position acquired in the position-in-first-region acquisition step or the position-in-second-region acquisition step.

6. A computer-readable information recording medium recorded with a program causing a computer to function as:
first display control means for causing a game screen showing a state of a first region within a virtual three-dimensional game space to be displayed;

screen coordinate value acquisition means for acquiring a screen coordinate value according to a user's operation;

first judgment means for judging whether or not the screen coordinate value acquired by the screen coordinate value acquisition means is a screen coordinate value within the game screen;

position-in-first-region acquisition means for, if it is judged that the screen coordinate value acquired by the screen coordinate value acquisition means is a screen coordinate value within the game screen, acquiring a position within the first region corresponding to the screen coordinate value acquired by the screen coordinate value acquisition means;

second display control means for, if it is judged that the screen coordinate value acquired by the screen coordinate value acquisition means is not a screen coordinate value within the game screen, causing an image showing a state of a second region within the virtual three-dimensional game space to be displayed on a part of the game screen based on a positional relationship between the screen coordinate value acquired by the screen coordinate value acquisition means and the game screen for at least a predetermined time;

second judgment means for, if the image showing the state of the second region is displayed, judging whether or not the screen coordinate value acquired by the screen coordinate value acquisition means is a screen coordinate value within a region in which the image showing the state of the second region is displayed;

position-in-second-region acquisition means for, if it is judged that the screen coordinate value acquired by the screen coordinate value acquisition means is a screen coordinate value within the region in which the image showing the state of the second region is displayed, acquiring a position within the second region corresponding to the screen coordinate value acquired by the screen coordinate value acquisition means in place of the position-in-first-region acquisition means; and game advancing means for advancing a game based on the position acquired by the position-in-first-region acquisition means or the position-in-second-region acquisition means.

7. A game device according to claim 2, wherein:
the screen coordinate value acquisition means acquires a screen coordinate value according to the user's operation for each of a plurality of users;
the first judgment means judges, for each of the plurality of users, whether or not the screen coordinate value according to the user's operation is a screen coordinate value within the game screen;
the second display control means, if it is judged for at least some users of the plurality of users that the screen coordinate value according to the user's operation is not a screen coordinate value within the game screen, causes the image showing the state of the second region to be displayed on the part of the game screen for at least a predetermined time;
the second judgment means judges, for each of the at least some users, whether or not the screen coordinate value according to the user's operation is a screen coordinate value within the region in which the image showing the state of the second region is displayed; and
the position-in-second-region acquisition means, if it is judged for any one of the at least some users that the screen coordinate value according to the user's operation is a screen coordinate value within the region in which the image showing the state of the second region is displayed, acquires a position within the second region corresponding to the screen coordinate value according to the user's operation in place of the position-in-first-region acquisition means.

8. A game device according to claim 7, wherein:
the first display control means causes an image showing the state of the first region to be displayed; and
the second display control means comprises:
means for storing: a judgment result condition related to a judgment result that has been obtained by the first judgment means for each of the plurality of users from a predetermined time before up to a present time; and composition manner information related to a manner in which the image showing the state of the second region is combined with the image showing the state of the first region, in association with each other; and
means for causing an image formed by combining the image showing the state of the second region with a part of the image showing the state of the first region to be displayed on the game screen based on the composition manner information associated with the judgment result condition satisfied by the judgment result obtained by the first judgment means for each of the plurality of users from the predetermined time before up to the present time.

9. A game device, comprising:
one or more processors configured to:
cause a game screen showing a state of a first region within a virtual three-dimensional game space to be displayed;
acquire a screen coordinate value according to a user's operation;
judge whether or not the screen coordinate value is a screen coordinate value within the game screen;
acquire, if it is judged that the screen coordinate value is a screen coordinate value within the game screen, a position within the first region corresponding to the screen coordinate value;
cause, if it is judged that the screen coordinate value is not a screen coordinate value within the game screen, an image showing a state of a second region within the virtual three-dimensional game space to be displayed on a part of the game screen based on a positional relationship between the screen coordinate value and the game screen for at least a predetermined time;
judge, if the image showing the state of the second region is displayed, whether or not the screen coordinate value is a screen coordinate value within a region in which the image showing the state of the second region is displayed;
acquire, if it is judged that the screen coordinate value is a screen coordinate value within the region in which the image showing the state of the second region is displayed, a position within the second region corresponding to the screen coordinate value in place of the position within the first region corresponding to the screen coordinate value; and
advance a game based on the position within the first region corresponding to the screen coordinate value or the position within the second region corresponding to the screen coordinate value.

* * * * *